(12) United States Patent
Rabin

(10) Patent No.: US 10,592,390 B2
(45) Date of Patent: Mar. 17, 2020

(54) DETECTING ANOMALOUS FUNCTION EXECUTION IN A PROGRAM

(71) Applicant: Nintendo Co., Ltd., Kyoto (JP)

(72) Inventor: Steve Rabin, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 549 days.

(21) Appl. No.: 14/288,747

(22) Filed: May 28, 2014

(65) Prior Publication Data

US 2015/0347285 A1 Dec. 3, 2015

(51) Int. Cl.

| G06F 11/00 | (2006.01) |
|---|---|
| G06F 11/36 | (2006.01) |
| G06F 11/34 | (2006.01) |
| G06F 11/07 | (2006.01) |
| G06F 11/30 | (2006.01) |
| G06F 11/32 | (2006.01) |

(52) U.S. Cl.
CPC ...... *G06F 11/3616* (2013.01); *G06F 11/0736* (2013.01); *G06F 11/0751* (2013.01); *G06F 11/0772* (2013.01); *G06F 11/34* (2013.01); *G06F 11/362* (2013.01); G06F 11/0721 (2013.01); G06F 11/3013 (2013.01); G06F 11/3024 (2013.01); G06F 11/321 (2013.01); G06F 2201/865 (2013.01)

(58) Field of Classification Search
CPC ............. G06F 11/3616; G06F 11/3466; G06F 11/3409; G06F 11/3664; G06F 11/3419; G06F 11/362
See application file for complete search history.

(56) References Cited

U.S. PATENT DOCUMENTS

| 9,798,644 B2 * | 10/2017 | Beck | G06K 9/6201 |
|---|---|---|---|
| 2009/0055802 A1 * | 2/2009 | Crosby | G06F 11/3466 717/125 |
| 2009/0113303 A1 * | 4/2009 | Goossen | A63F 13/10 715/719 |
| 2010/0079463 A1 * | 4/2010 | Rabin | G06T 11/206 345/440 |
| 2012/0222017 A1 * | 8/2012 | Hinkle | G06F 11/30 717/130 |
| 2014/0095945 A1 * | 4/2014 | Sankaran | G06F 11/0754 714/51 |

* cited by examiner

*Primary Examiner* — Michael Maskulinski
(74) *Attorney, Agent, or Firm* — Nixon & Vanderhye, P.C.

(57) ABSTRACT

Methods and systems for detecting anomalous function execution in a program, such as a video game or simulation program, are described herein. Certain methods attempt to isolate and score functions that behave in a particular manner that is deemed to be problematic within a repetitive program. Other methods can use the repetitive nature of the program to directly compare and isolate problematic functions.

22 Claims, 22 Drawing Sheets

DETECTING ANOMALOUS FUNCTION EXECUTION IN A PROGRAM

BACKGROUND

An anomaly is something that deviates from some type of standard or norm. Anomalies are found in many aspects of life including the arts and sciences. For example, a genetic anomaly in biology could refer to a disorder related to a chromosomal mutation. A running software program can exhibit anomalies as well.

DETAILED DESCRIPTION OF EXAMPLE NON-LIMITING EMBODIMENTS OF THE TECHNOLOGY

Figure 1:
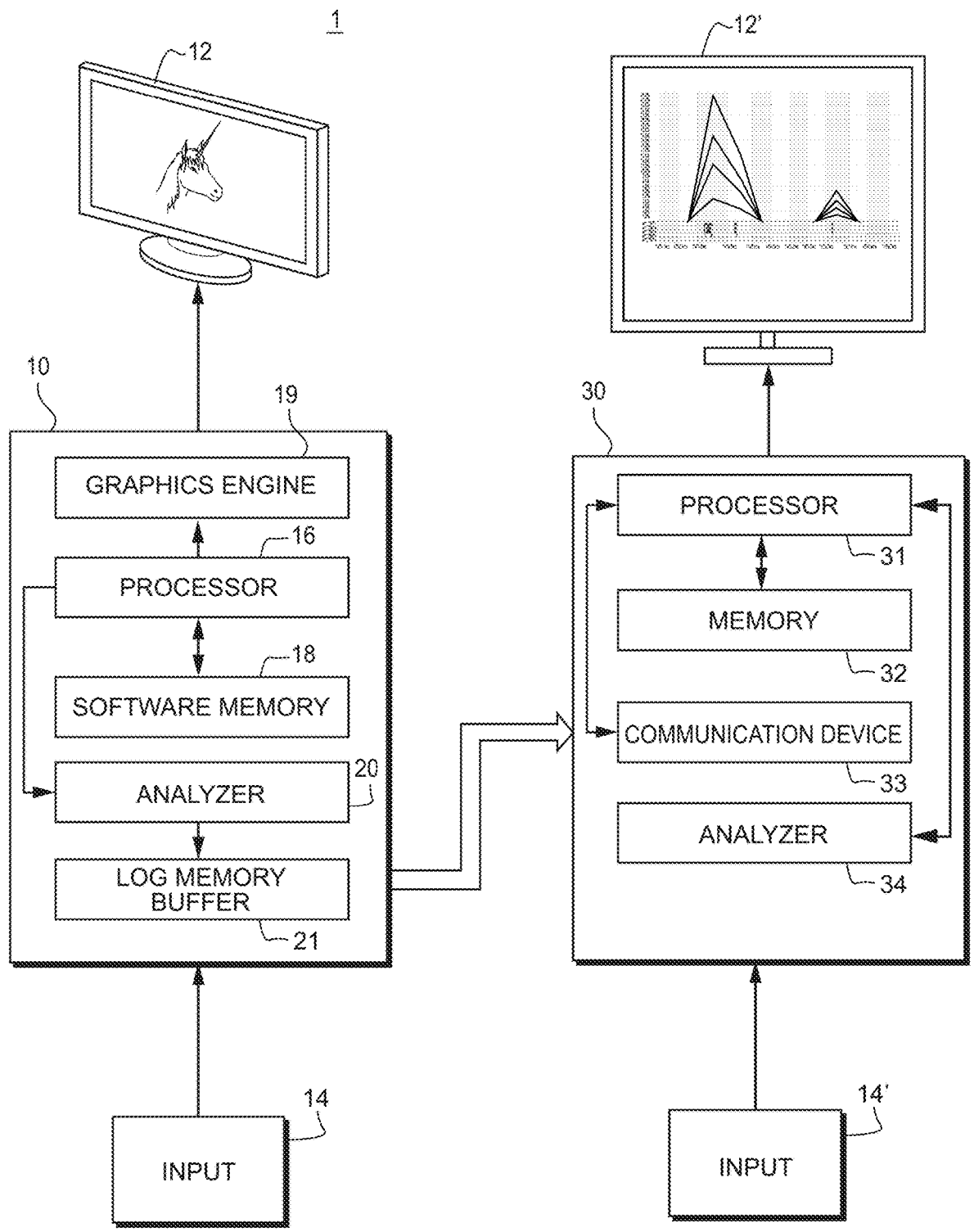
FIG. 1 is a non-limiting example block diagram of a software profiling system.

Software profilers aid in analyzing the dynamic behavior of a computer program (e.g., for optimizing the program's performance or finding bugs or other problems). Commonly-assigned U.S. application Ser. Nos. 12/533,845, 12/534,048, 14/165,818, and 14/249,514 (also incorporated herein by reference) describe example profilers. This disclosure describes a way to improve upon current software profiler systems in order to classify and display anomalous behavior of software execution in a program.

In many types of software, execution time and efficiency is of paramount concern. A profiler is a software tool that can help a developer to understand the execution of a software program and rank functions recorded over a period of time by how long they took to execute. However, in video game and simulation software, for example, these programs often have a simulation or video frame rate that is desirable to be maintained in order to operate properly. Therefore it is often desirable to identify problematic parts of the software that are disrupting the simulation or video frame rate by, for example, momentarily taking too much time or otherwise disrupt the execution of other processes. Since these problematic functions might only sporadically affect the other processes, they might not show up in an absolute ranking of functions sorted by total execution time (which can be a typical output of a profiler). This creates a need for a much more nuanced method of finding problematic functions, especially when there might be thousands of functions to look through.

The technology described in this disclosure is directed to methods for detecting anomalous function execution in a program, such as a video game or simulation program. The technology is especially useful when analyzing cyclic repetitive programs in which the same operations tend to be executed every frame. Five of the methods (Rare, Burst, Flutter, Swell, and Wild) attempt to isolate and score functions that behave in a particular manner that is deemed to be problematic within a program. The sixth method (Bad Frame) uses the repetitive nature of the program to directly compare and isolate problematic functions.

These anomalies can be graphically represented by "spikes" in the program execution and various embodiments can differ from other fields, in which they may be detecting some spike in activity, in a variety of ways. First, the data being analyzed is statistical data sampled from a running program, where, for example, the program is periodically stopped and the currently running function is recorded. Second, the technology is unique in that it works with a repetitive program such as a video game or simulation, where generally the same code or similar code is executed periodically. Third, the technology analyzes and identifies particular patterns (not technically spikes) and is thus tuned to find functions based on the desirable patterns and then scores them as to how close they are to the desirable pattern. Fourth, the raw data indicates whether a given function is being executed during a specific sample time or not, which is a binary property, so the finding of patterns is based on identifying groups of on/off conditions over time.

Anomalous function behavior can be classified into several categories. This disclosure describes some of these categories, including rare behavior, burst behavior, flutter behavior, swell behavior, wild behavior, and bad function identification. Of course, these are just examples and many other types of behavior can be identified using some, or all, of the techniques described herein.

Executing functions can exhibit a variety of traits during function execution and these traits can be used to describe particular types of anomalous functions that a developer may want to identify. These may be in contrast to a "typical" function, which is one that periodically executes (e.g., every simulation or video frame), taking approximately about the same amount of time during each period (e.g., FIG. 2).

Figure 3:
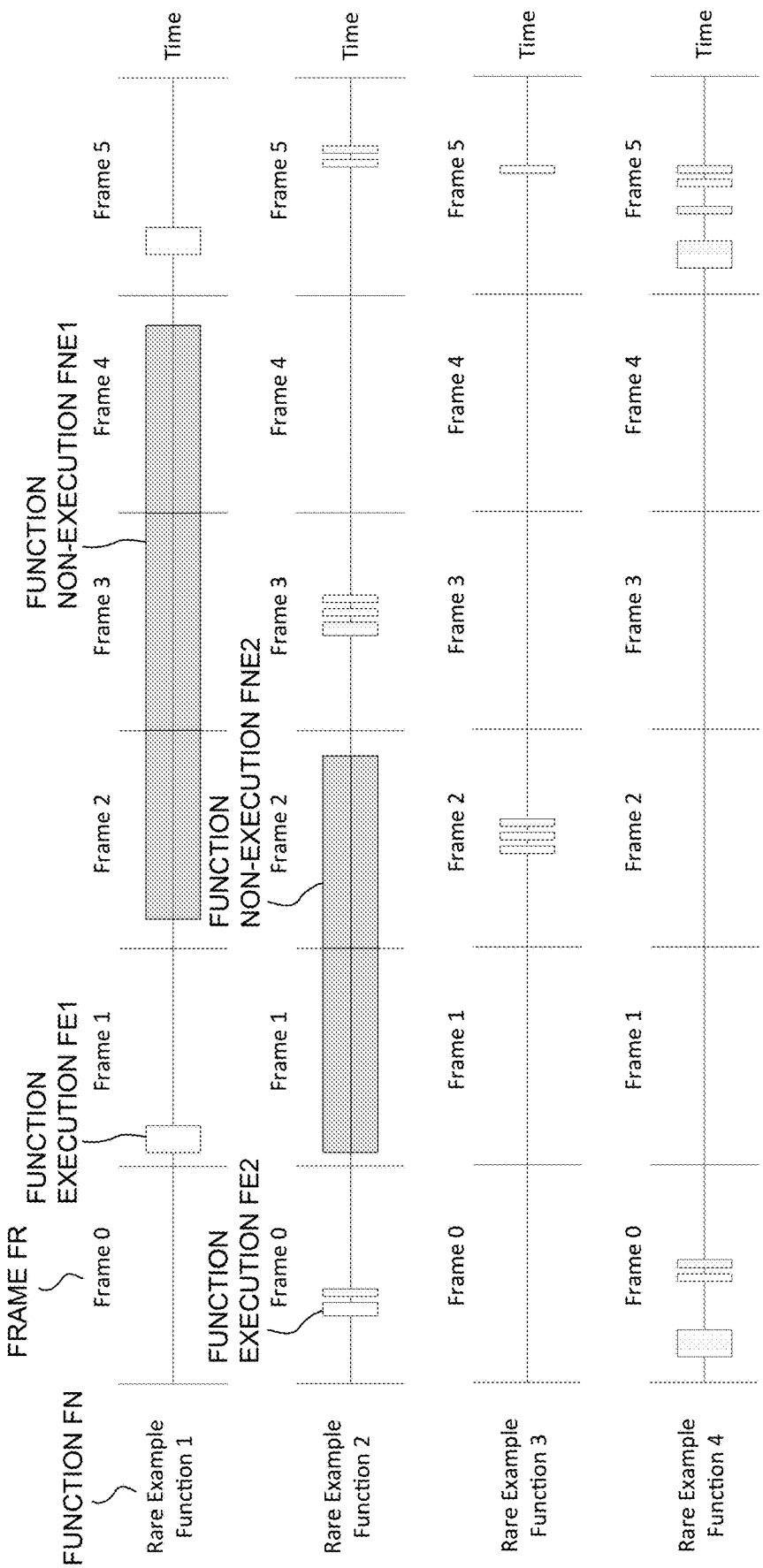
FIG. 3 shows a non-limiting example of function execution exhibiting anomalous behavior.
Figure 4:
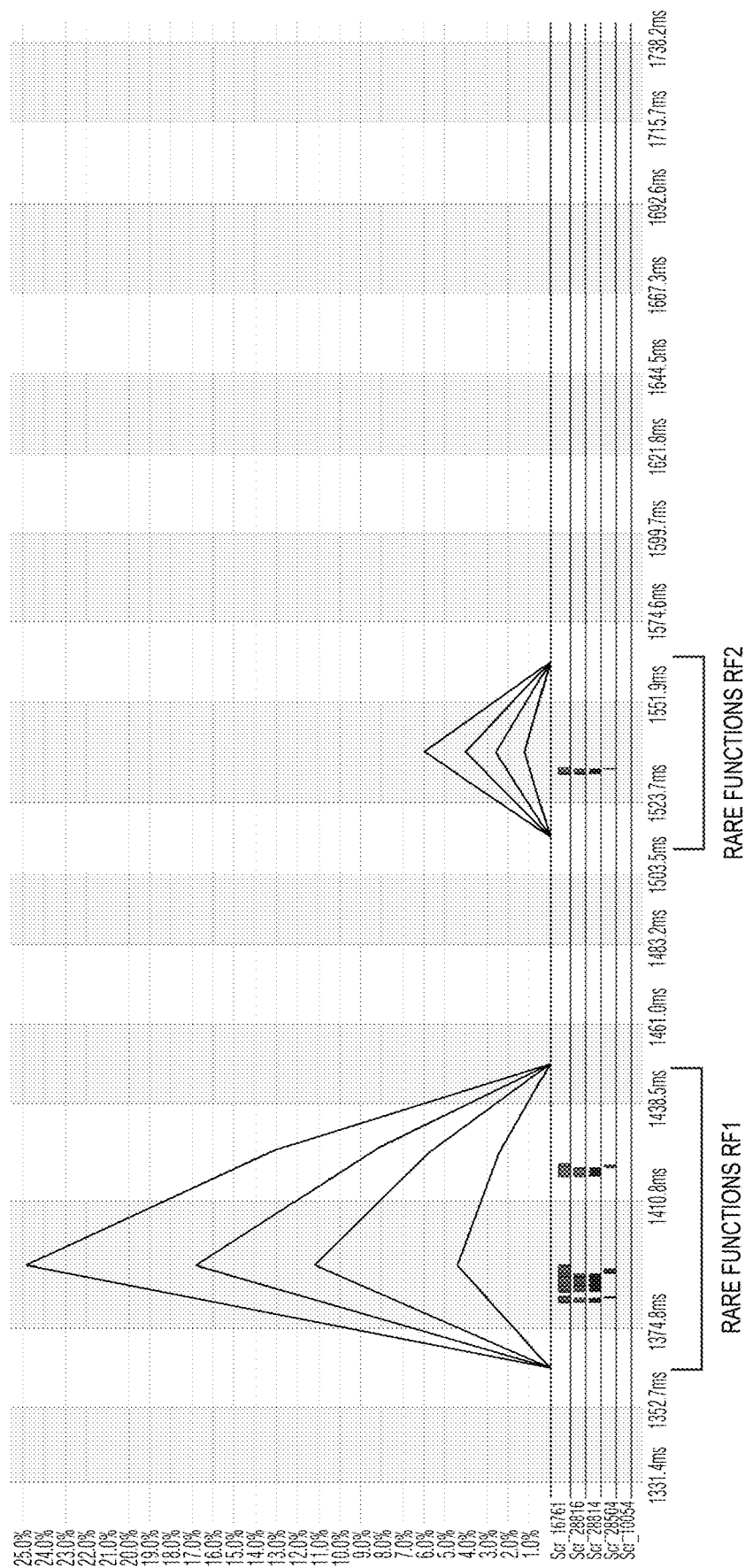
FIG. 4 shows a non-limiting graphical display of function execution exhibiting anomalous behavior.

One example of an anomalous function is a "rare" function, which is one that does not periodically execute and rarely executes, but when it does execute it takes a significant amount of time (e.g., FIGS. 3 and 4).

Another anomalous function is a "burst" function. A burst function does not periodically execute, does not execute a majority of the time, and will generally execute on successive simulation frames while not executing on other successive frames. When its execution time is graphed against the frame rate, the data line is mostly at zero but has "bursts" of activity over consecutive frames (e.g., FIGS. 6 and 7).

A "flutter" function is a function that periodically executes in which its execution time varies significantly from one period of activity to another when it does execute. This can be described as a sudden significant change in a periodic function. When its execution time is graphed against the frame rate, the data line sharply flutters up and down over time (e.g., FIGS. 9 and 10).

A "swell" function is a function that periodically executes in which its execution time varies significantly from its maximum to its minimum, yet varies very little between consecutive duration times. This can be described as a gradual, yet significant, change in a periodic function. When its execution time is graphed against frame rate, it resembles, for example, an ocean swell (e.g., FIGS. 12 and 13).

Figure 15:
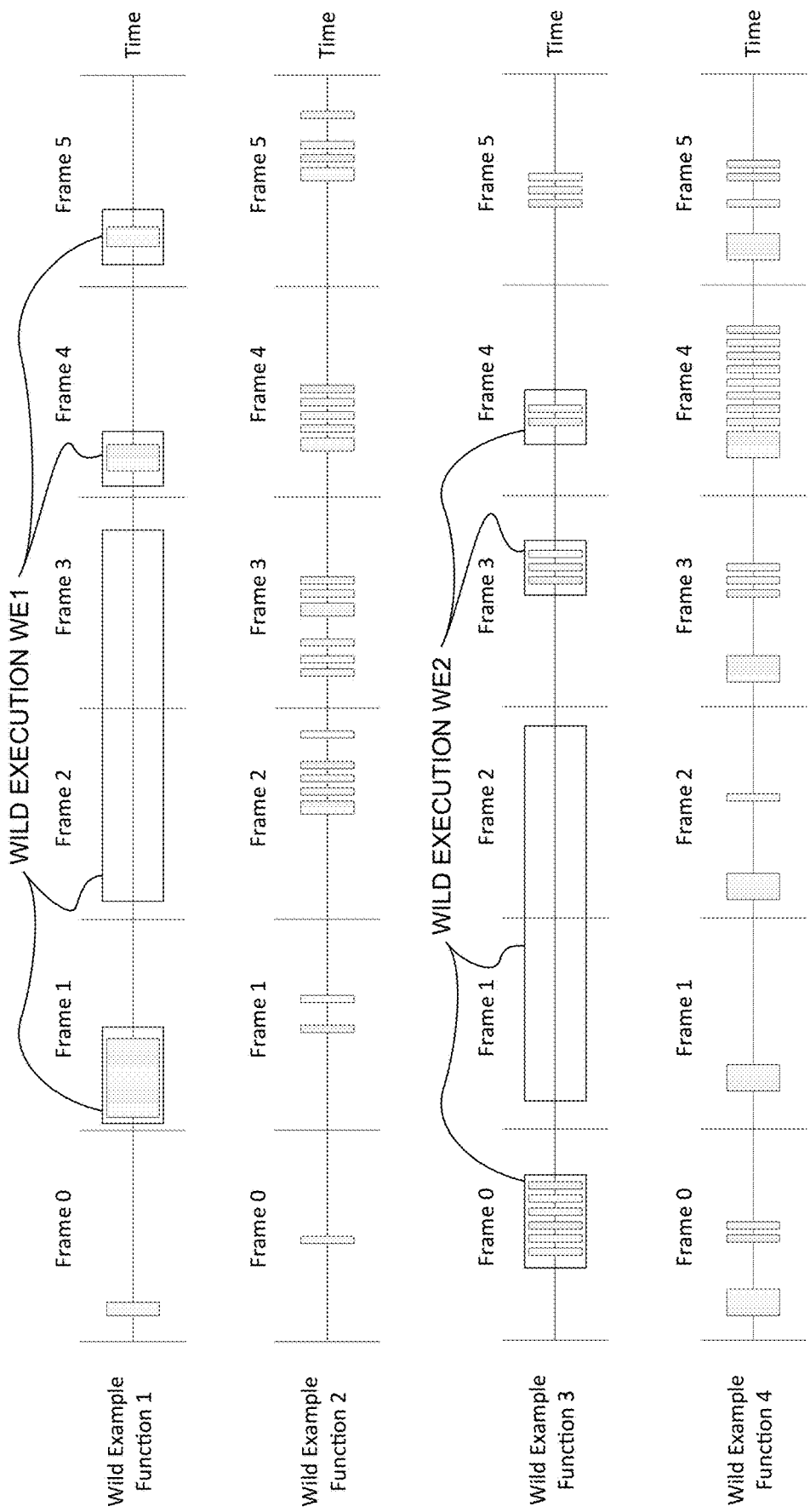
FIG. 15 shows a non-limiting example of function execution exhibiting anomalous behavior.
Figure 16:
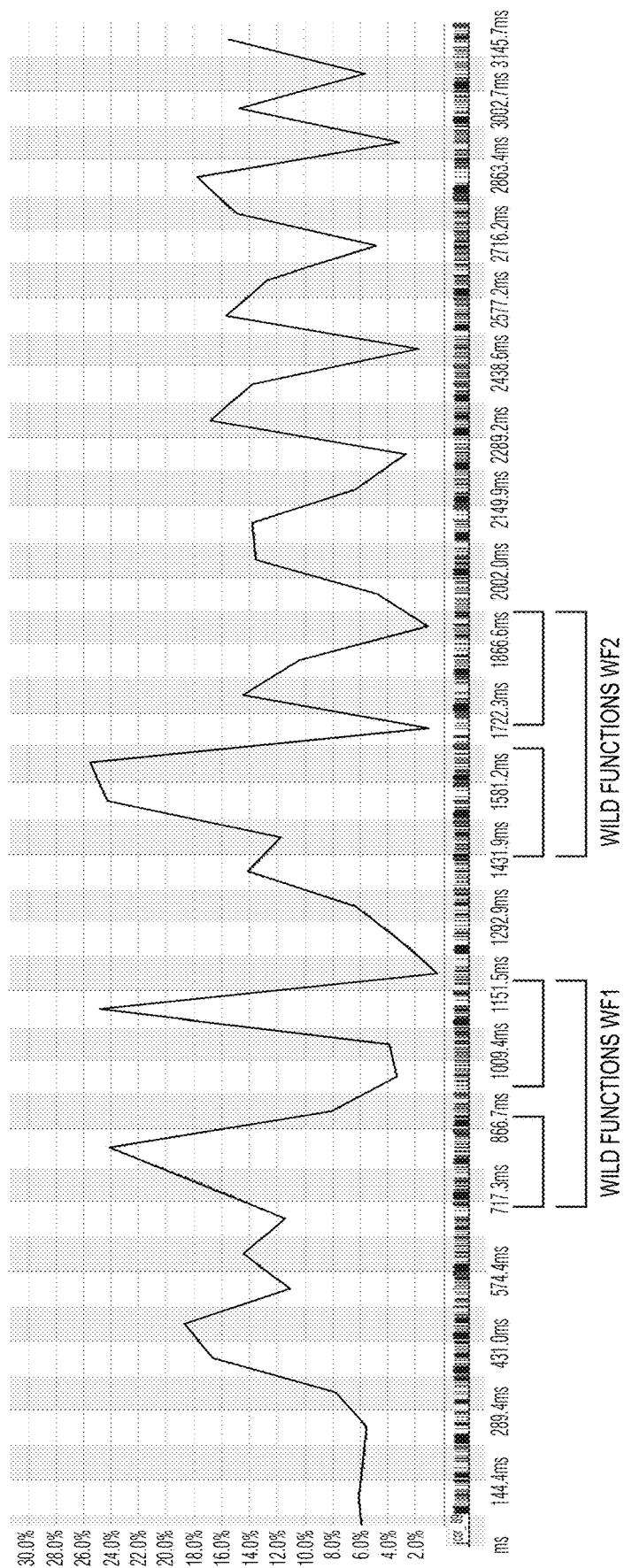
FIG. 16 depicts a non-limiting example graphical display of function execution exhibiting anomalous behavior.

A "wild" function is a function in which its execution time over its lifetime varies significantly (e.g., FIGS. 15 and 16). Finally, another example of an anomalous function is a "bad" function, which is a function that executes for more time on a long frame, compared with its average execution time on all other frames (e.g., FIGS. 18 and 19). The example software profiling system described herein is configured to analyze a program and identify such anomalous behavior, among others.

Example Software Profiling System

FIG. 1 is a block diagram showing an illustrative non-limiting implementation of a software profiling system 1, which can include, for example, an embedded computing device. The software profiling system 1 can be used, for example, in classifying and displaying types of anomalous behavior in software execution. Although example software profiling system 1 can be specifically used for analyzing video game software, it should be understood that it can profile any type of software. System 1 runs functions while also providing analysis. The system 1 includes a computing system 10 connected to a display 12 (or display device 12) and an input device 14. The computing system 10 includes a processor 16, which can execute a video game or other program. The game or other program can be stored in a non-transitory game software memory 18. System 1 further includes a graphics engine 19 that generates graphics for display on the display 12. The system 1 is not limited to a single processor or memory, but can comprise multi-core architecture, multiple processors and/or multiple memories, and/or remotely accessed network (e.g., cloud) computing components. Input from input device 14 can affect/control program execution.

The graphics engine 19 includes a frame buffer memory that composes images periodically at a frame rate (e.g., every $1/30^{th}$ or $1/60^{th}$ of a second) and reads out the images for display on the display 12. Frame refresh rate may be controlled by a timer that interrupts the processor 16 periodically or non-periodically. Display 12 may output audio/video data from the program being executed on system 10.

The computing system 10 can further include an analyzer 20 used in gathering the program execution data when the processor 16 executes a software program. The analyzer 20 can be implemented in any combination of software, hardware, and firmware. In one non-limiting illustrative embodiment, the analyzer 20 is a form of a software profiler that monitors a sequence of operations performed by the processor 16 while the processor executes the software program. The analyzer 20 collects data, which may specify various functions that are called during the execution of the software program, and their addresses, which in turn indicate where in the memory program the instructions are stored, as well as counts of times particular functions are called. The analyzer 20 can store the collected data in a non-transitory log memory buffer 21.

The system 1 also includes a software analysis device 30 (or information processing apparatus 30) capable of communicating with the computing system 10 via a communications device 33, for example. The data that is stored in the log memory buffer 21 can be conveyed to the software analysis device 30. The software analysis device 30 is also configured to have a processor 31 for analyzing the execution of a software program and a non-transitory memory 32 capable of storing a program for analyzing the execution of a software program. Likewise, the device 30 can be in communication with an input 14' and a display 12'.

The analysis device 30 is also configured with an analyzer 34 that can analyze the dynamic program behavior of a software program based on the analysis data provided from the computing system 10. Any of the components shown in system 1 could be incorporated in system 10 and/or on a remote system connected via a network (e.g., in the cloud or datacenter).

Display 12' can display a visualization of the analysis being performed by device 30. For example, a user can play a video game using system 10 where the game is displayed on display 12 while device 30 analyzes the gameplay and displays a visualization on display 12'. The technology is not limited to separately displaying these items and the same information can be conveyed on a single display or across a multitude of displays.

Figure 2:
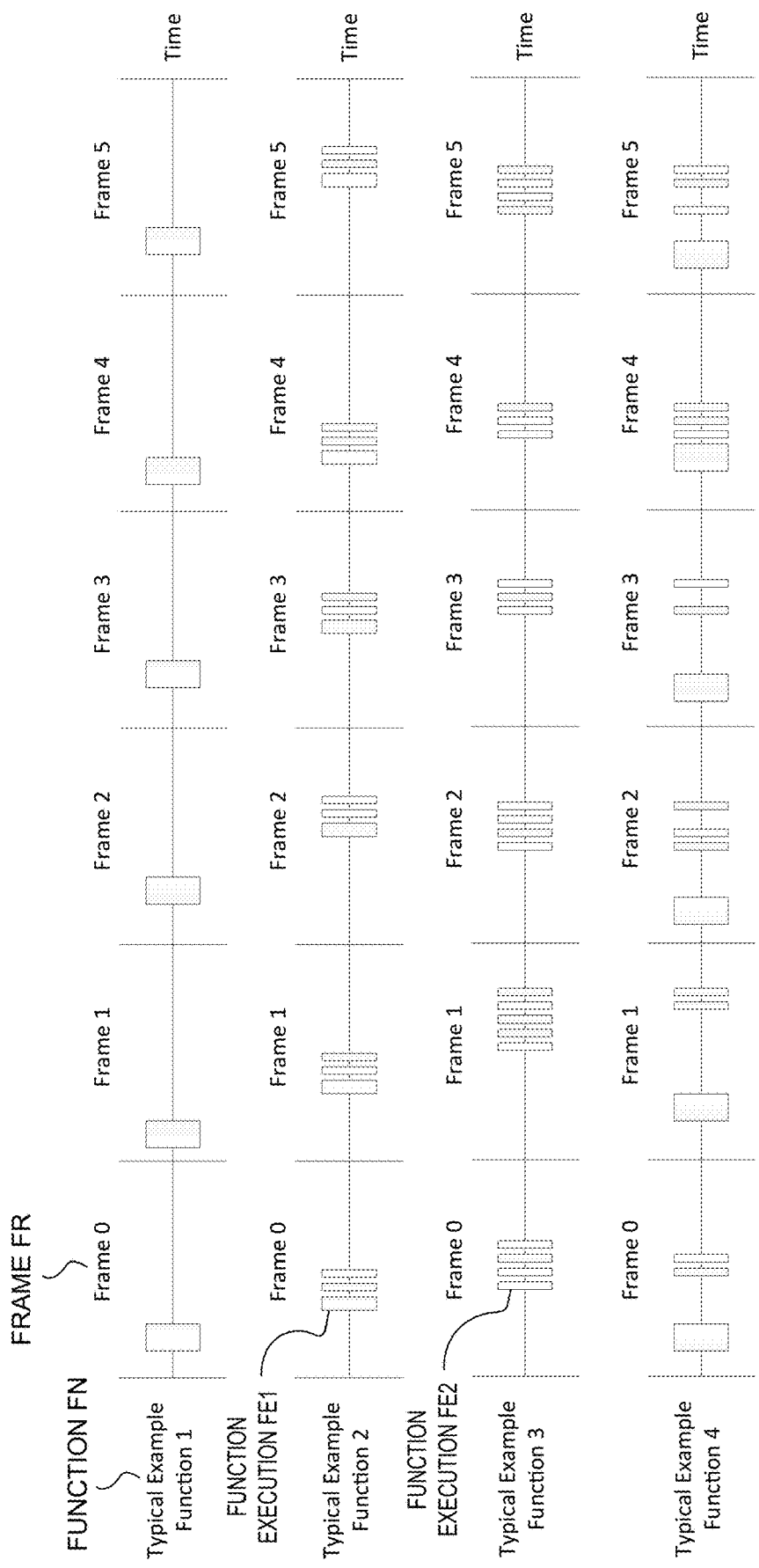
FIG. 2 is a non-limiting example display of function execution over time.

FIG. 2 shows a non-limiting example display of function FN execution over time. The function FN execution can occur across one or more display frames FR. FIG. 2 depicts a non-limiting example of "typical" function execution where each function FN respectively executes for approximately the same amount of time in each frame FR. For example, function execution FE1 executes for function 2 over at least five frames for roughly the same period of time (e.g., three "bars" of function execution). Likewise, function execution FE2 is shown as executing for approximately the same amount of time for function 3 (e.g., between three to five "bars" of function execution). The program behavior shown in FIG. 2, for example, would be considered a "normal" running program for these functions and thus the execution does not exhibit any type of anomalous behavior. Although FIG. 2 shows examples of function execution for functions 2 and 3, it should be appreciated that all functions shown in FIG. 2 (i.e., functions 1-4) exhibit the "normal" execution described herein. Likewise, each respective function shown in FIGS. 3, 6, 9, 12, 15, and 18 exhibits the type of execution described with respect to the particular figure.

FIG. 3 shows a first non-limiting example of function execution exhibiting anomalous behavior referred to as "rare" execution. Although rare execution could be caused by any different software system (e.g., graphics, artificial intelligence, audio), rare execution has a tendency to be seen in "garbage" collection recovery of computer resources. It should also be appreciated that rare execution is exhibited by non-periodic behavior. For example, function 1 in FIG. 3 shows function execution FE1 occurring during frame 1 where function non-execution FNE1 (representing periods where no execution is occurring) spans frames 2-4. Likewise, function 2 exhibits function execution FE2 occurring at frames 0 and 3 where function non-execution FNE2 occurs during frames 1, 2, and 4. Thus, the behavior of function execution tends to be somewhat minimal and non-periodic at the same time.

This is further exemplified in the non-limiting example graph shown in FIG. 4 where function execution appears minimal over the approximately 400 ms time frame except for function execution during rare functions RF1 and RF2. As can be seen in FIG. 4, the function execution exhibits little to no behavior over the course of time with the exception of the two portions RF1 and RF2 where there is basically no periodic rhythm of execution exhibited between these functions.

Figure 5A:
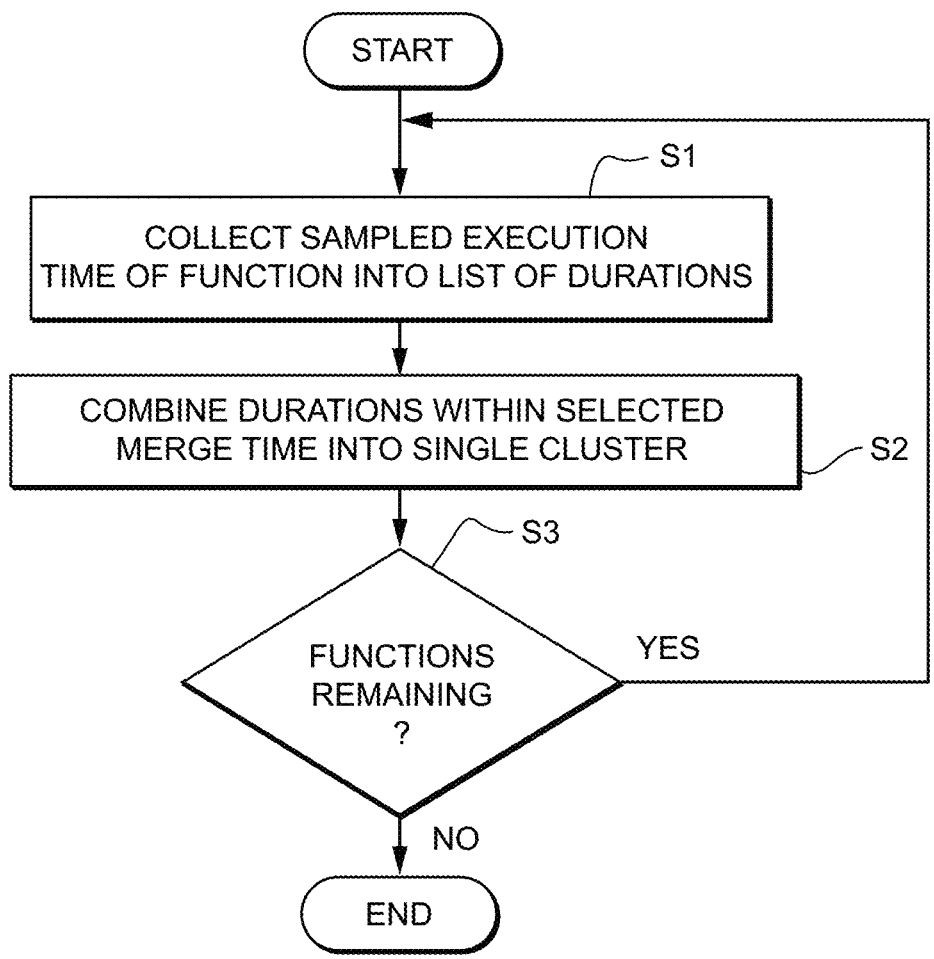
FIGS. 5a and 5b are non-limiting example processes for detecting types of behavior in executing functions.
Figure 5B:
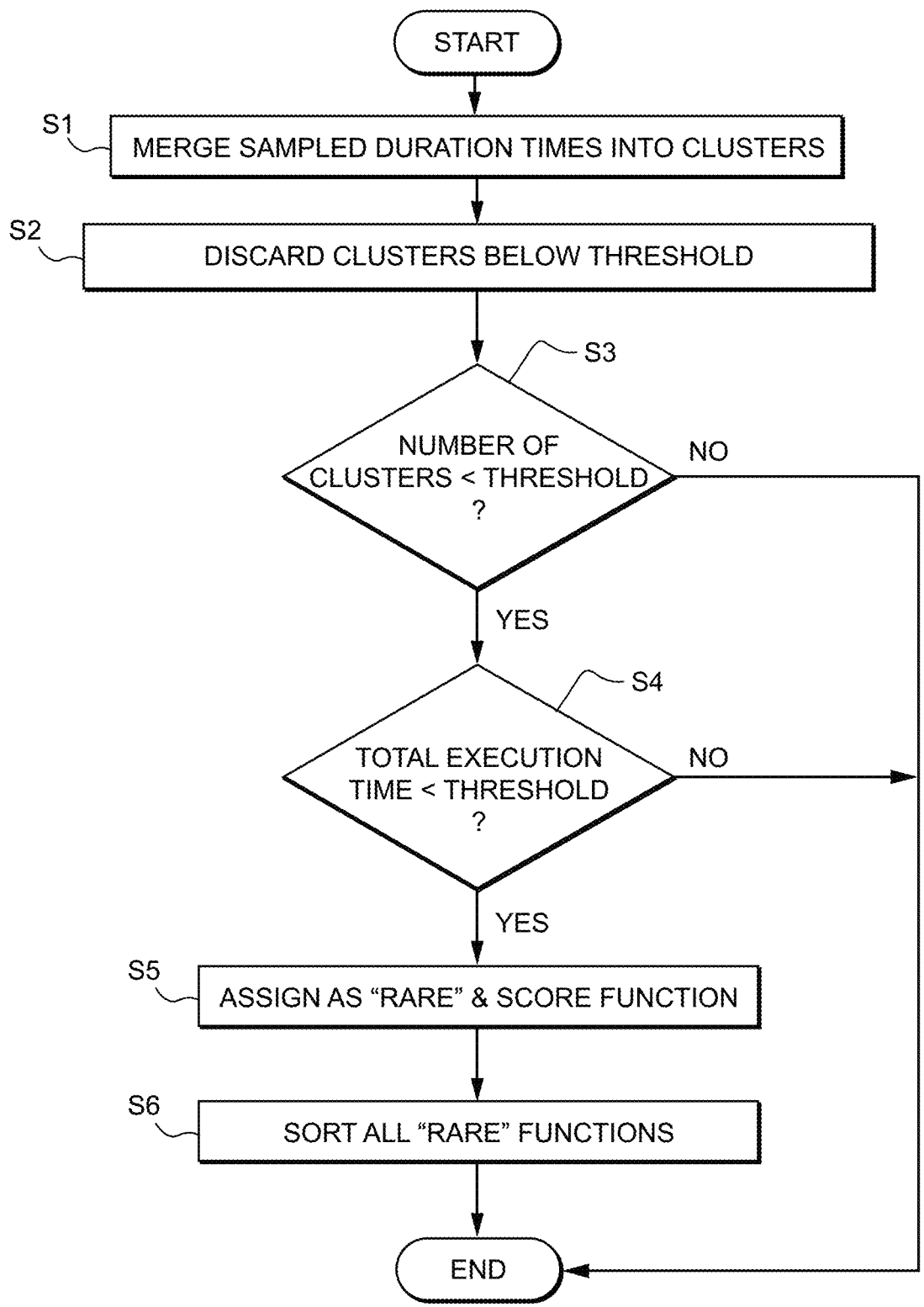

FIGS. 5a and 5b are non-limiting example flowcharts describing a process for detecting rare function execution. FIG. 5a depicts an example background process for a "merge" algorithm used in detecting rare execution (as well as burst execution). The process begins by, for a given function, taking all sampled execution times and collecting them into a list of durations (e.g., start time and end time) (S1). Given the duration list, a particular merge time (e.g., 4 ms) is chosen and all durations that are within this merge time of each other are combined into a single cluster duration. The merge time can be chosen by using a preselected portion of time based upon the overall amount of time used during a frame of execution. Upon selecting the merge time, the functions can be "clustered" together based upon the gaps in execution between each function. For example, if the merge time is 4 ms, function execution having gaps of less than (or equal to) 4 ms can be grouped together as a "cluster" of function execution. The process retains the actual combined execution time within each cluster and designates it as the "actual execution time of the cluster" (S2). This process can be repeated for all functions executing in the program (S3). Further details of the merge process (as well as any process described in this specification for identifying code execution rhythm) are described in commonly assigned U.S. patent application Ser. No. 14/165,818 (incorporated by reference).

FIG. 5b depicts an example process for detecting rare function execution. The process can be iterated over all executing functions and begins by, for a given function, merging sampled duration times into clusters by combining durations that are within T time of each other (e.g., 4 ms) (S1). The process then discards all clusters in which its "actual execution time" is below a particular threshold (e.g., eliminating spurious data) (S2). If the number of cluster durations for this function is below a threshold count (e.g., "10" as defined by a user), then the process continues to test this function as a possible rare function (S3). If the total execution time of the function during the profile (e.g., the total period of time encompassed by the profile) is below a threshold value (e.g., "10%" as defined by a user), then the function is considered a rare function and the function is scored (S4). The process assigns a rare score by taking the squared "actual execution time" for each cluster and adding them all together (S5). All rare functions are sorted highest scoring to lowest scoring and can be displayed to a user (S6). An example display is shown in FIG. 4 where the function execution can be graphically represented using a line graph having a percentage of function execution along one axis with the duration (e.g., time) of function execution along another axis. It should be appreciated that the display shown in FIG. 4 is one example of how function execution can be displayed and is non-limiting. For example, the functions could be displayed in a sorted list ranked from highest to lowest score depending upon the type of anomaly detected.

Figure 6:
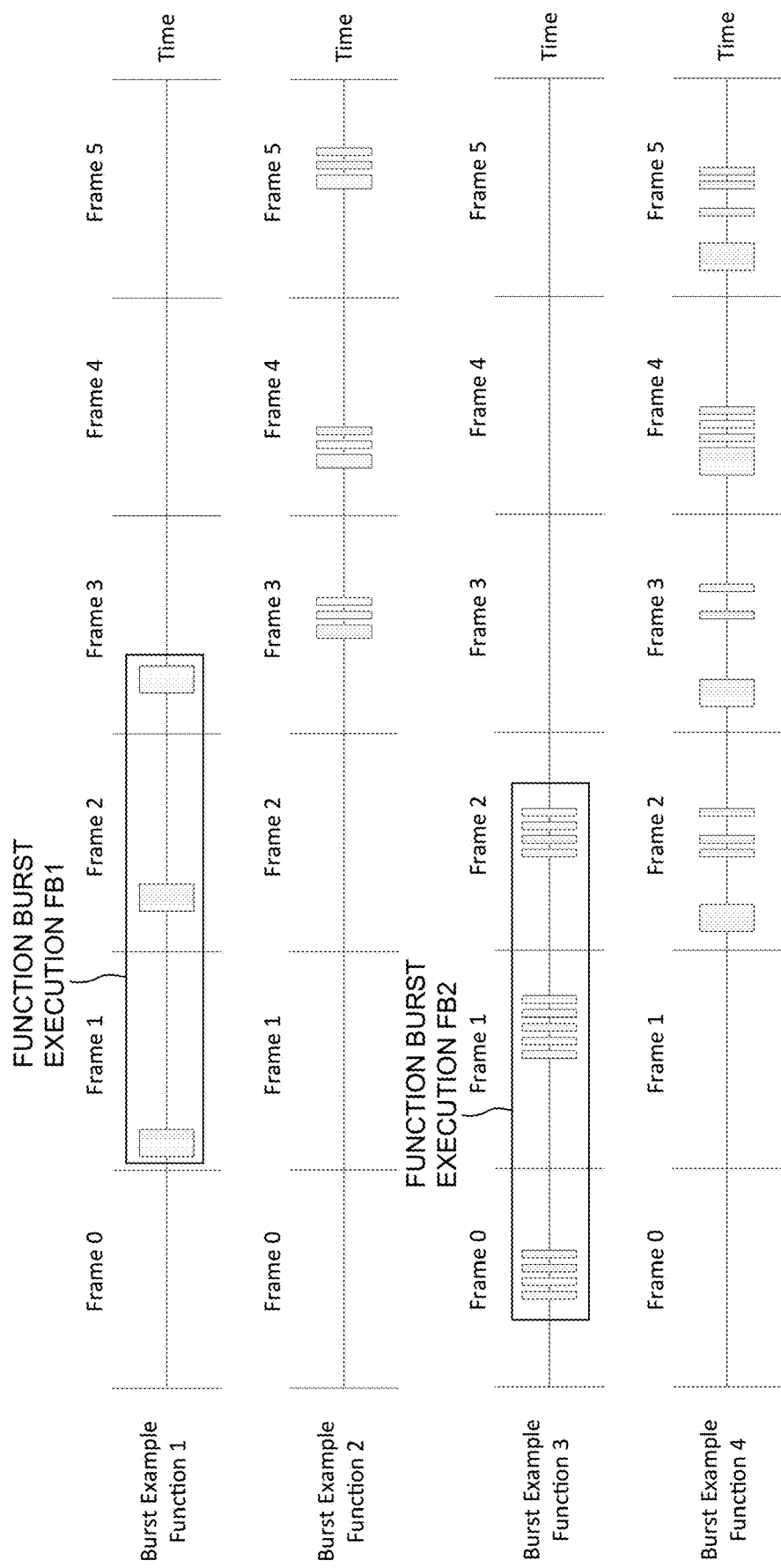
FIG. 6 shows another non-limiting example of function execution exhibiting anomalous behavior.

FIG. 6 shows a non-limiting example of function execution exhibiting anomalous behavior referred to as "burst" execution. Burst execution is symptomatic of a function having a relatively continuous and process intensive execution for a duration of time. Similar to rare execution, burst execution is generally non-periodic but has a tendency to execute for longer continuous periods of time when it does execute (as opposed to rare). In the example shown in FIG. 6, function 1 exhibits function burst execution FB1 for frames 1-3 where function 3 exhibits function burst execution FB2 for frames 0-2. While the example shown in FIG. 6 depicts a relatively small number of frames, it can be appreciated that the burst could extend over a large number of frames during execution.

Figure 7:
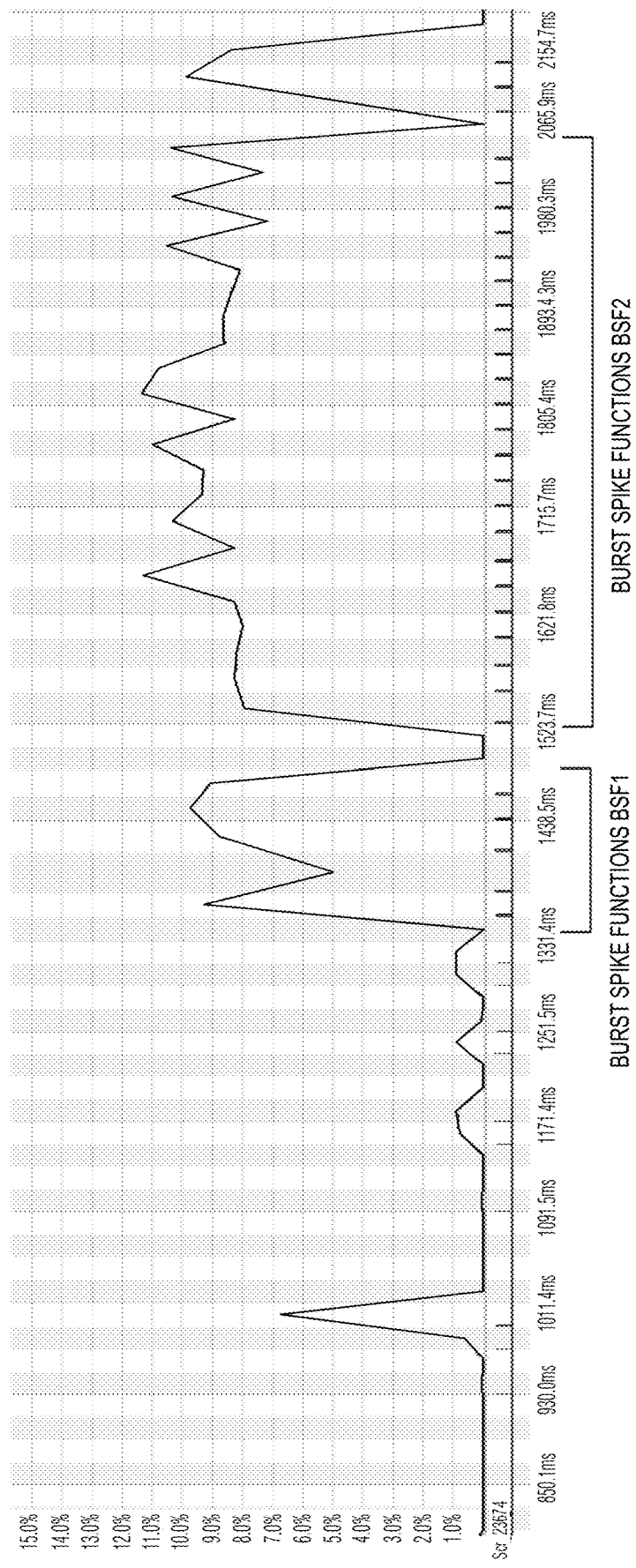
FIG. 7 shows another non-limiting graphical display of function execution exhibiting anomalous behavior.

FIG. 7 depicts a larger scale representation of burst execution shown over a period of almost 1200 ms. As can be seen in FIG. 7, burst function execution BSF1 and BSF2 is displayed over two time periods spanning different lengths. The execution remains relatively "quiet" for the first 500 ms (spanning approximately at 850 ms to 1331 ms) where the execution spikes for periods of approximately 150 ms and 500 ms, respectively. Burst execution could be indicative of many different aspects of function execution. But, in video game execution, the burst execution tends to occur during game effects including explosions. Identifying burst execution can also be helpful to a developer in that certain processes could be configured to be processed on different cores of a multi-core processor, for example. Thus, the processes that contain the burst execution anomaly will not necessarily tie up, for example, a core executing a "main" program loop.

Figure 8A:
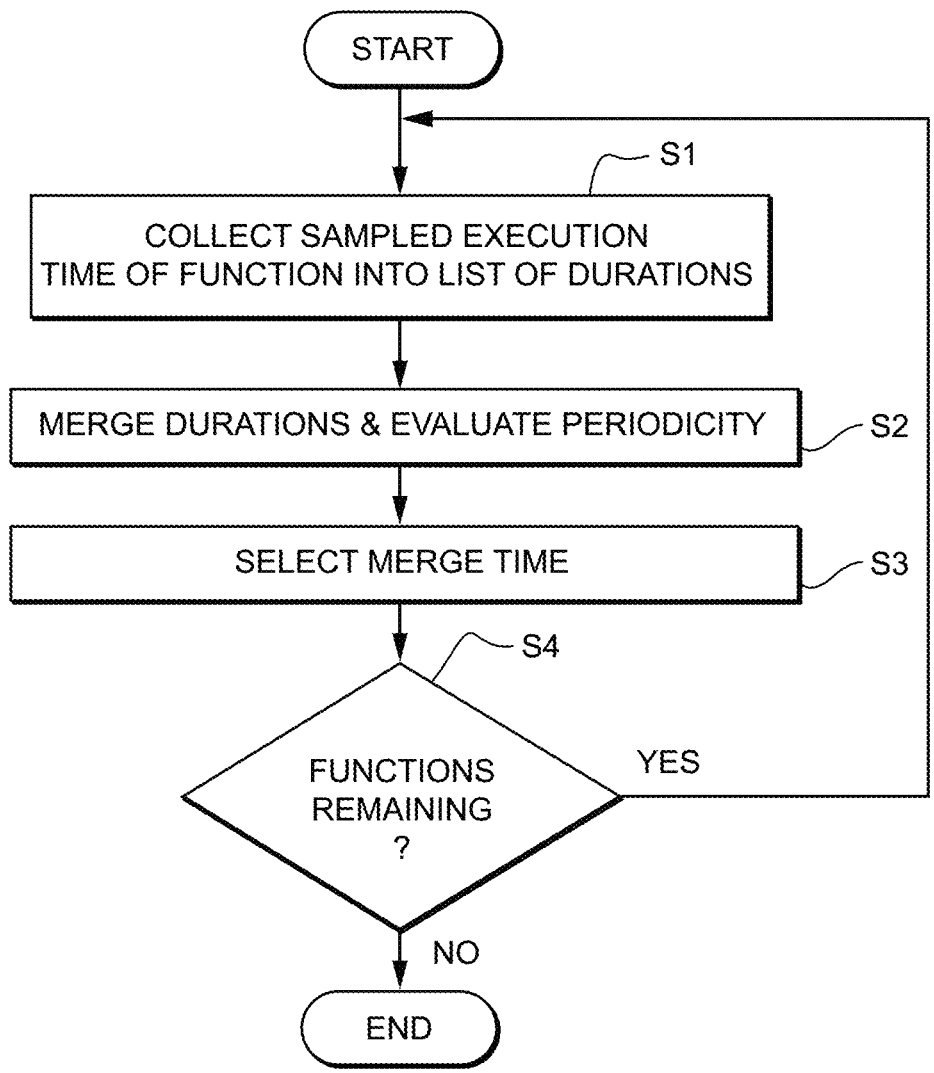
FIGS. 8a and 8b show non-limiting examples processes for detecting types of behavior in executing functions.
Figure 8B:
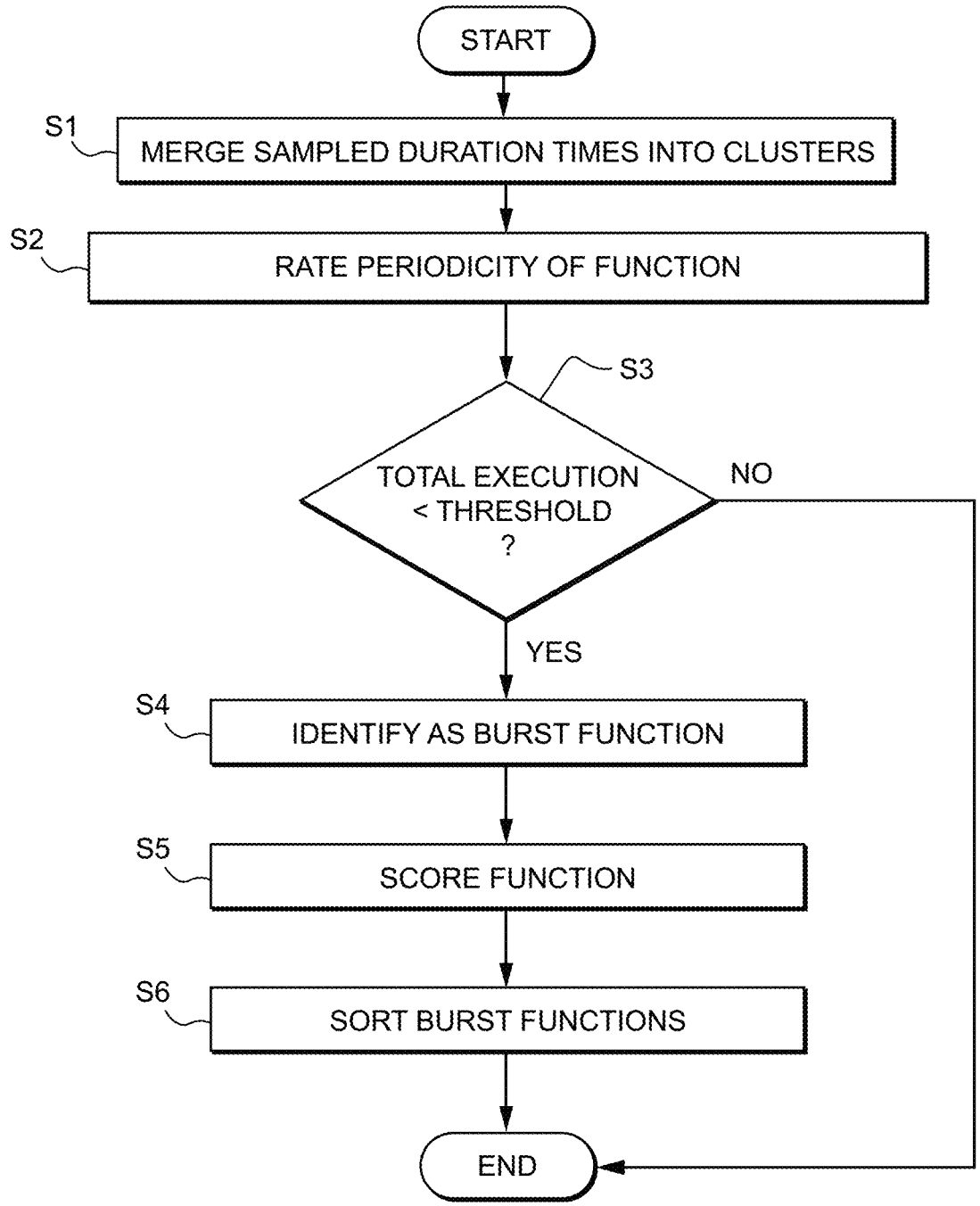

FIGS. 8a and 8b are non-limiting example flowcharts describing a process for detecting burst function execution. FIG. 8a depicts an example background process for a "periodic" algorithm used in detecting burst execution (as well as flutter and swell execution). The process begins by, for a given function, collecting all sampled execution times into a list of durations (e.g., start time, end time) (S1). The process then varies the merge values to merge the durations and evaluate the periodicity of each duration (S2). As a non-limiting example, the process can select different merge times (e.g., 1 ms, 2 ms, 4 ms, 8 ms) in which to "cluster" the function execution based on the time between gaps in execution. That is, if a merge time of 2 ms is selected, function execution having a gap in execution greater than 2 ms will not be "clustered" together. Likewise, function execution having a gap in execution of 2 ms or less will be "clustered" together. Scores relating to the periodicity of function execution for each merge time are generated and the merge time having a highest score (e.g., representing the lowest periodic variance) can then be selected. That is, the process then chooses the merge time (e.g., 4 ms) resulting in a lowest periodic variance, which is remembered (e.g., stored in memory). A list of cluster durations (as discussed above) is created based on this merge time (S3) and the process is repeated for all remaining functions (S4). Further details of this process are described in commonly assigned U.S. patent application Ser. No. 14/165,818 (incorporated by reference).

FIG. 8b depicts an example process for detecting burst function execution. The process can be iterated over all functions and begins by, for a given function, merging sampled duration times into clusters by combining durations that are within T time of each other (e.g., 4 ms) (S1). The process then rates the function as to how periodic it is. If the function is too periodic (e.g., having a periodic variance that is below a threshold), then the process ignores the function (e.g., the function is not a burst function) (S2). It should be appreciated that the processes performed in S1 and S2 can incorporate, at least, the processes described in FIG. 8a.

If the total execution time of the function during the profile is below a threshold value (e.g., "40%" as defined by a user) (S3), then the function is considered as a burst function (S4) and is subsequently scored.

In scoring (S5), the process creates a sliding window of size 50% over the length of the profile. The process starts the window at time zero and separately sums the square of the individual function execution times of each cluster within the window and outside the window so that there are two final sums. The process then takes the absolute value of the difference of the sums and stores this value as MaxDifference.

The process then proceeds to slide the window X percent (e.g., 10%) further in time and repeats the calculation of the execution time within the window and outside the window. If the absolute value of the difference is larger than MaxDifference, then the process stores it in MaxDifference and proceeds to slide the window X percent further in time. The process is repeated until the window reaches the end of the profile time period and, once complete, the burst score for this function is equal to MaxDifference. A given period of execution could comprise between seven or eight windows (of course not limiting to such and could be more or less) where the windows help identify contiguous execution. The burst functions are sorted from highest scoring to lowest scoring and can be displayed to a user (S6).

Figure 9:
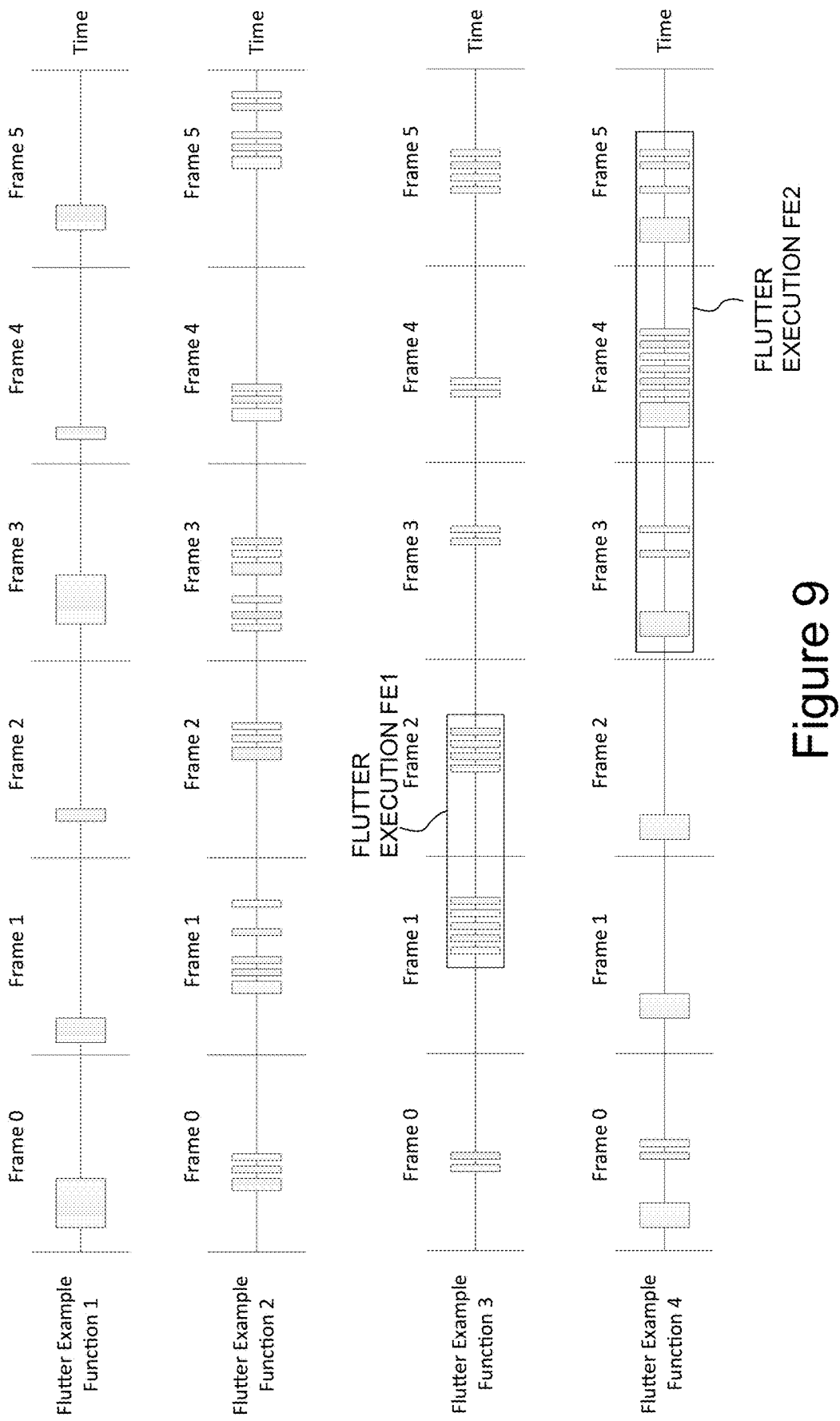
FIG. 9 shows a non-limiting example of function execution exhibiting anomalous behavior.

FIG. 9 shows a non-limiting example of function execution exhibiting anomalous behavior referred to as "flutter" execution. Flutter execution exhibits periodic execution behavior and is exhibited during relatively continuous execution of a given function. In the example shown in FIG. 9, function 3 exhibits flutter execution FE1 during frames 1 and 2 of execution where function 4 exhibits flutter execution FE2 during frames 3 to 5 of execution. As can be seen in FIG. 9, function 3 executes consistently over frames 0 to 5 but "flutters" (e.g., executes for slightly longer duration) during frames 1 and 2. Function 4 also shows such behavior where the program executes relatively consistently over frames 0 to 5 but has slightly longer duration of execution in frames 3 to 5.

Figure 10:
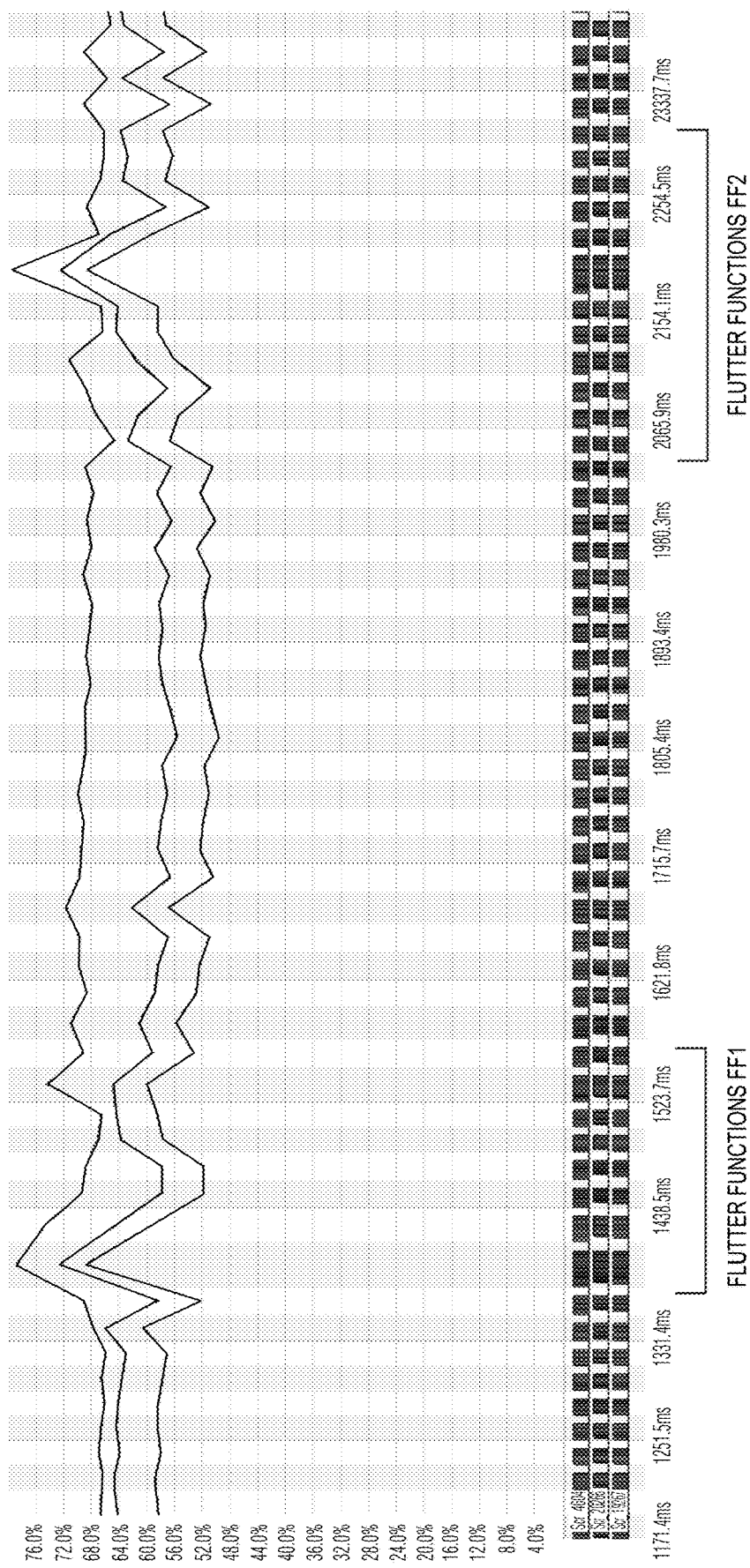
FIG. 10 depicts a non-limiting graphical display of function execution exhibiting anomalous behavior.

FIG. 10 depicts a larger scale representation of flutter execution shown over a period of about 1000 ms. As can be seen in FIG. 10, the functions execute at a relatively consistent percentage over the 1000 ms time window except during portions of flutter function execution FF1 and FF2 depicted as running for approximately 200 ms and 250 ms, respectively. During these time periods the execution spikes for short durations when compared to the execution percentage of the function over the 1000 ms time span. The flutter processing essentially looks for a "jolt" (or derivative thereof) from one cluster of function execution to another (e.g., a change in "jolt" across clusters).

The flutter execution could be exhibited based on a variety of factors. In video game program execution, flutter execution could be indicative of artificial intelligence processing in a plurality of game characters where the random thinking could cause an increase in load processing. This identification could help a developer better determine how to load-balance such a process.

Figure 11:
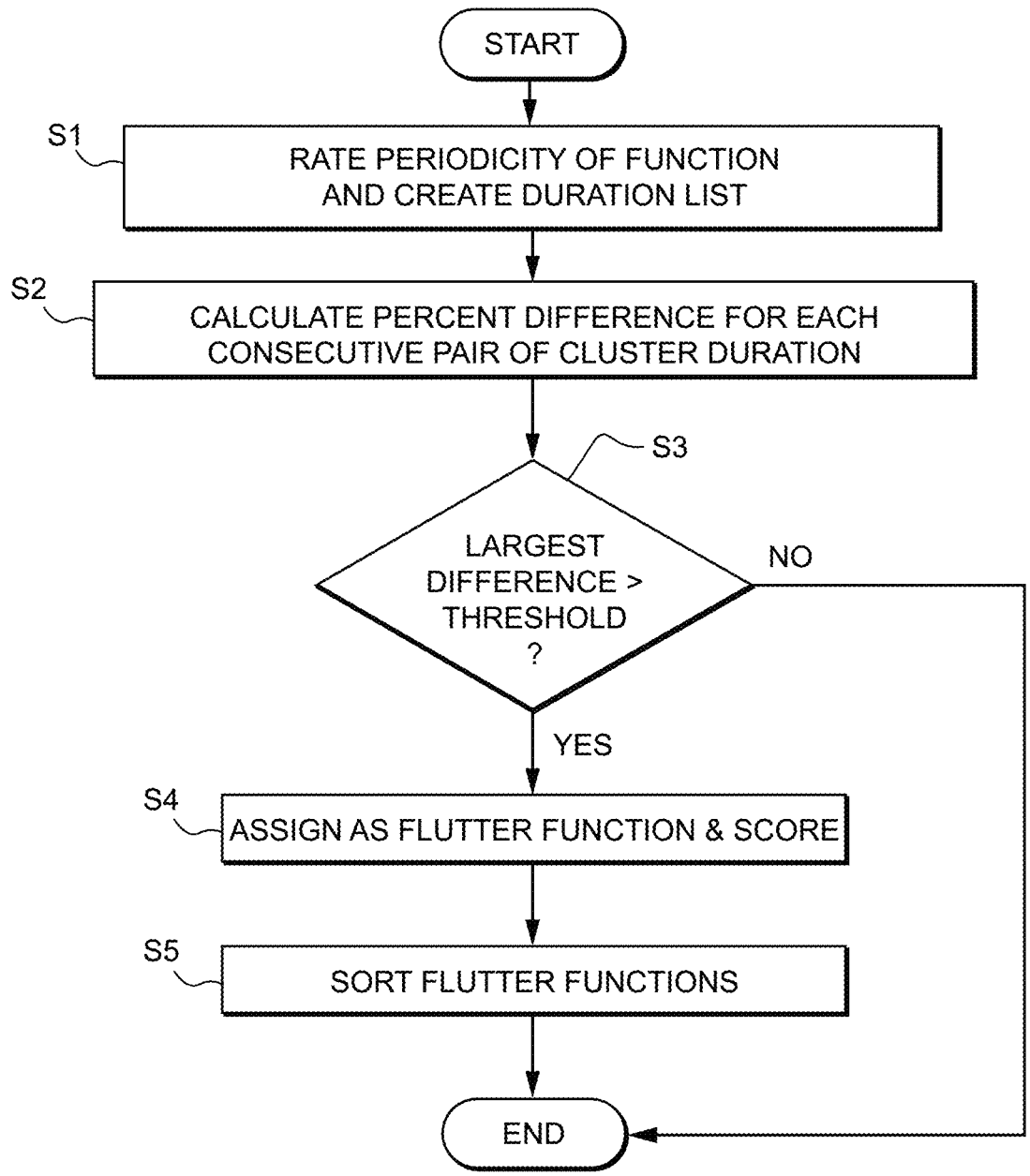
FIG. 11 shows a non-limiting example process for detecting types of behavior in executing functions.

FIG. 11 depicts an example process for detecting flutter function execution. The process can be iterated over all functions and begins by, for a given function, rating how periodic it is and creating a duration list based on the most periodic clusters (e.g., attempts to find "meld" times to find certain clusters). If the function is periodic enough (e.g., its periodic variance is below a threshold), then the process continues and uses the clusters (S1). The process then, from one execution cluster duration time to another, calculates the percent difference for each consecutive pair and remembers (e.g., stores in a memory) the largest difference (S2). If the largest difference is greater than a threshold (e.g., "20%" as defined by a user) (S3), then the process considers this as a flutter function and uses the largest difference as the flutter score (S4). The process then sorts all flutter functions from highest scoring to lowest scoring and can display the same to a user (S5).

Figure 12:
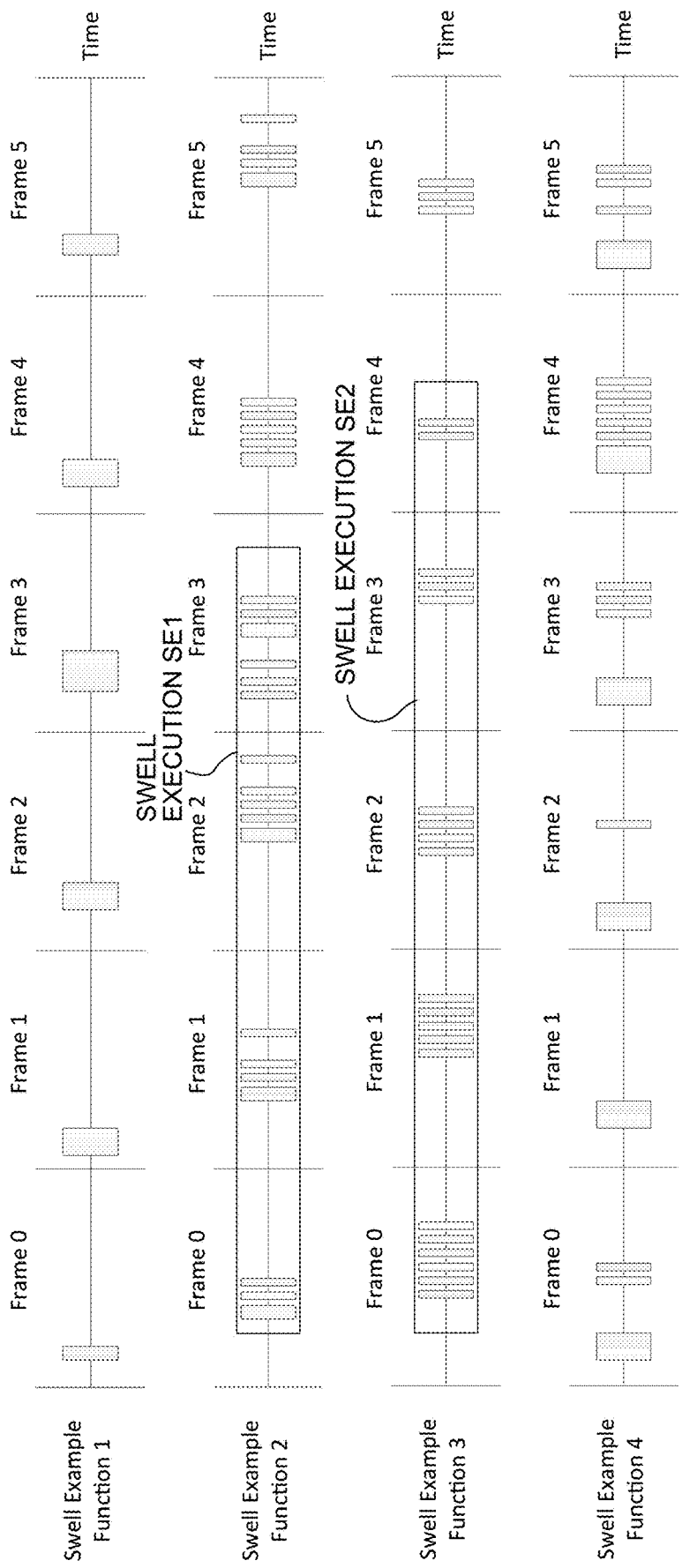
FIG. 12 shows another non-limiting example of function execution exhibiting anomalous behavior.

FIG. 12 shows a non-limiting example of function execution exhibiting anomalous behavior referred to as "swell" execution. Swell execution also exhibits periodic behavior much like flutter execution. However, swell execution is different from flutter execution in that swell execution does not "jolt" quickly over time like flutter execution. That is, swell can be best described as gradually rising and falling over a period of time. Swelling also does not require both rising and falling, and can also be indicative of function execution gradually rising over time, or function execution gradually falling over time.

FIG. 12 shows a few non-limiting examples of swell execution. For example, function 2 displays swell execution SE1 occurring during frames 0-3 where function 3 displays swell execution SE2 during frames 0-4. That is, the execution during frames 0-5 for function 2 gradually swells to longer execution between frames 0-3 and then swells to shorter execution between frames 4 and 5. Likewise, the execution for function 3 gradually swells to shorter execution between frames 0-4 and then swells to longer execution in frame 5.

Figure 13:
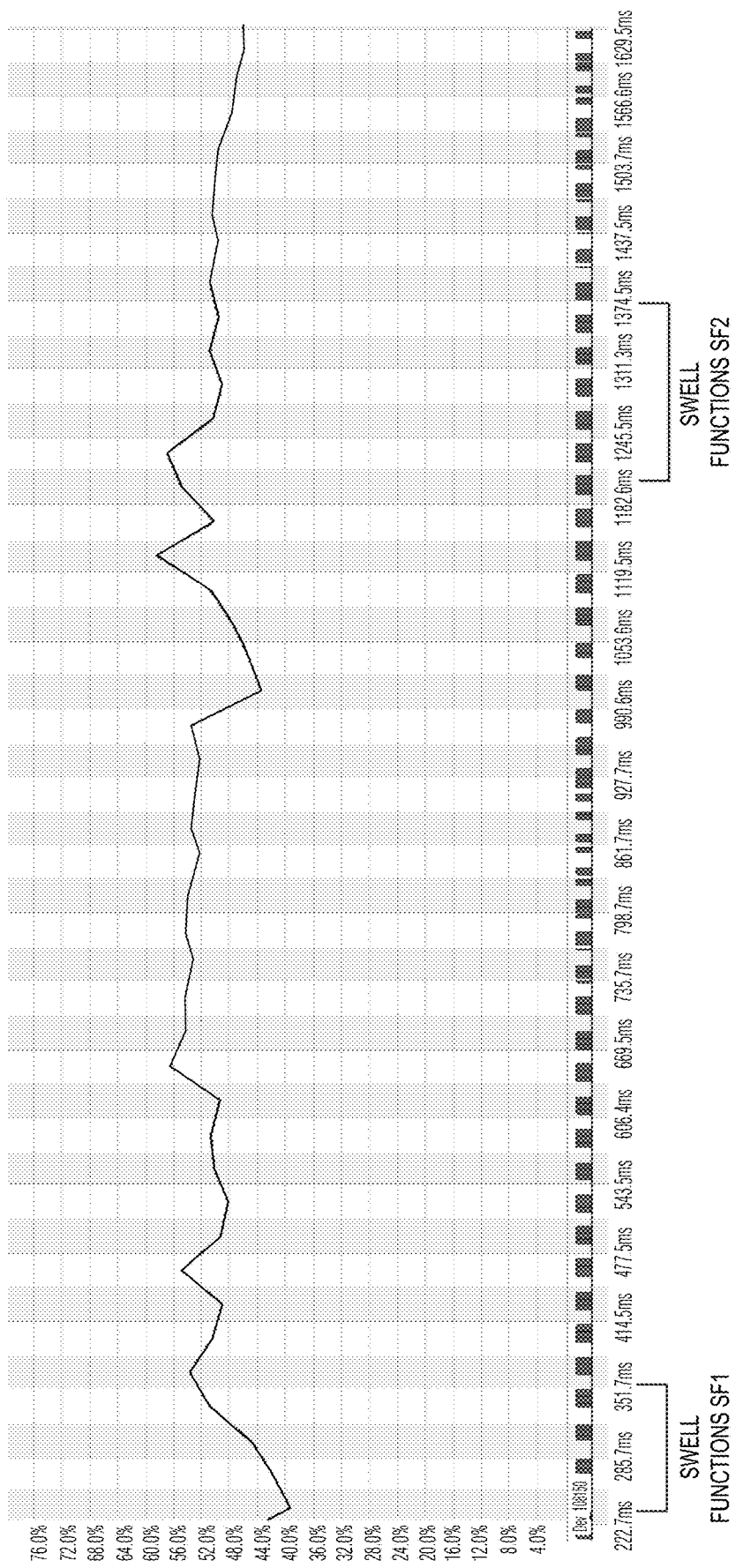
FIG. 13 depicts another non-limiting graphical display of function execution exhibiting anomalous behavior.

FIG. 13 shows swell execution over a larger time frame spanning approximately 1400 ms. As can be seen in FIG. 13, the percentage of execution is generally consistent over the 1400 ms time period with gradual rising and falling at certain points. For example, execution swells "up" and "down" during swell function execution SF1 and SF2. That is, the execution at approximately 230 ms begins to rise gradually during swell function execution SF1 and has gradual rising until approximately 375 ms. Likewise, swell function execution SF2 has gradual rising beginning at approximately 1200 ms and gradually rises and drops until approximately 1380 ms. Thus, the execution appears as though it rises and falls like an ocean swell. Although there are many aspects of execution that could cause a swelling effect, in video game processing, particle effects have a tendency to show swelling during execution.

Figure 14:
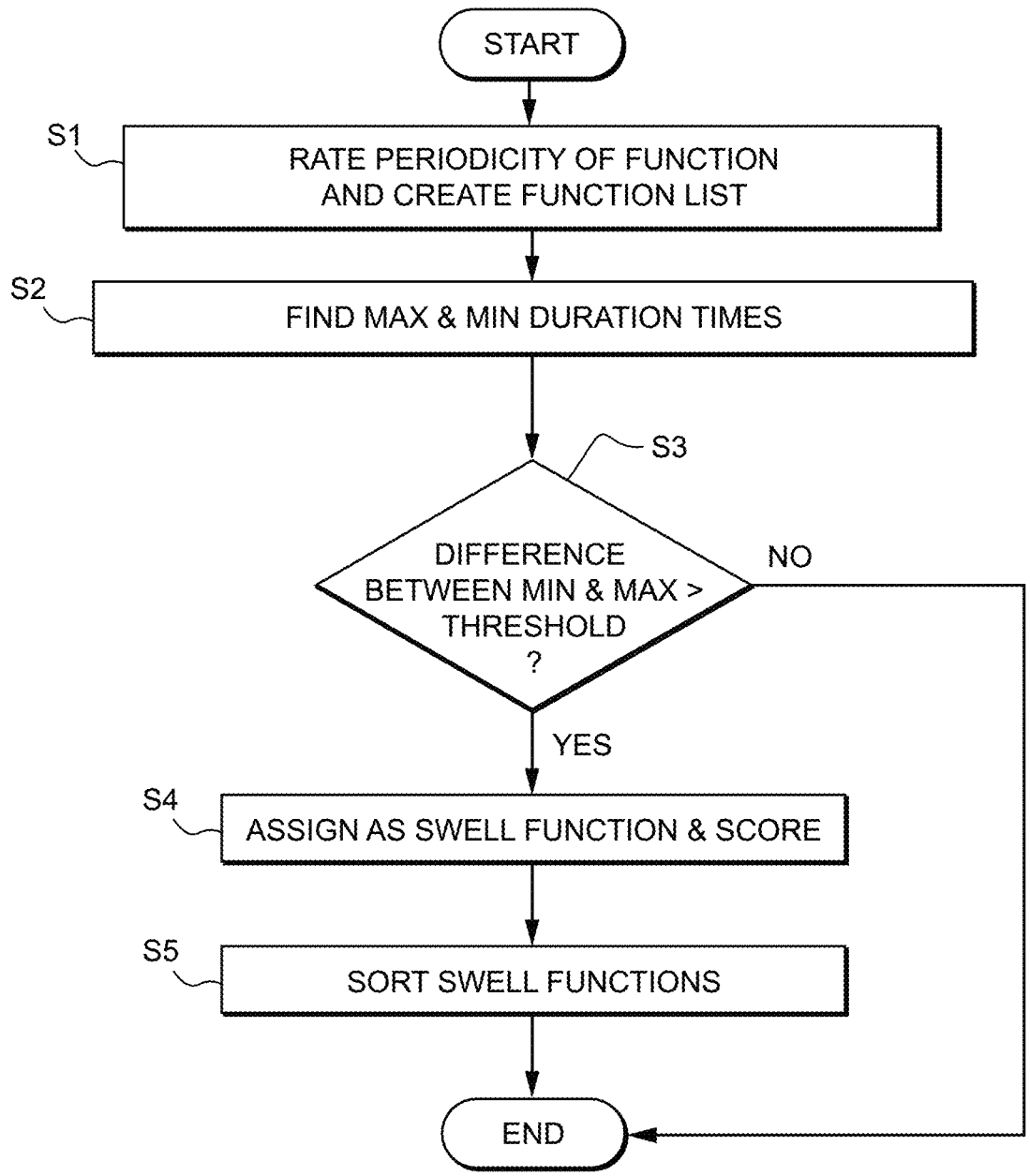
FIG. 14 is a non-limiting example process for detecting types of behavior in executing functions.

FIG. 14 depicts an example process for detecting swell function execution. The process can be iterated over all functions and begins by, for a given function, rating how periodic it is and creating a duration list based on the most periodic clusters (S1). If the function is periodic enough (e.g., its periodic variance is below a threshold as discussed with respect to FIGS. 8a, and 8b, above), then the process continues and uses the generated clusters. The process thus samples the function execution using different merge times (e.g., 1 ms, 2 ms, 4 ms, 8 ms) and then clusters the function execution based upon the gaps of execution with respect to each merge time. The merge time (or clusters formed thereof) having a periodic variance below a threshold value are used.

The process continues by finding the minimum and maximum duration times over all cluster duration times (S2). If the difference between the minimum and maximum is greater than a threshold (e.g., "20%" as defined by a user) (S3), then the function is considered as a swell function and is subsequently scored (S4). In scoring the function, the process finds the largest difference between consecutive pairs of duration times between all pairs of consecutive duration times. The function's swell score is the difference between the maximum and minimum duration times divided by the largest difference between consecutive pairs of duration times. The process then sorts all swell functions from highest scoring to lowest scoring and can display the same to a user (S5).

FIG. 15 shows a non-limiting example of function execution exhibiting anomalous behavior referred to as "wild" execution. Wild execution is generally exhibited by non-periodic (or erratic) behavior that can be best described as going "crazy" over time. The analysis for wild execution is similar to flutter execution except that the analysis focuses on non-periodic behavior rather than periodic behavior. The analysis also differs from the other methods described herein in that is looks at activity in individual frames (as opposed to clusters of execution).

In the example shown in FIG. 15, functions 1 and 3 (at the least) exhibit wild execution WE1 and WE2 as the execution is generally inconsistent and swings heavily between frames. For example, function 1 shows relatively large execution during frame 1, no execution during frames 2 and 3, and then relatively short execution in frames 4 and 5. Likewise, function 3 shows relatively large execution in frame 0, no execution in frames 1 and 2, and relatively short execution in frames 3 and 4. Thus, there is generally no obvious pattern to the execution of the respective functions between each of these frames.

FIG. 16 shows wild execution over a larger time frame spanning approximately 3000 ms. Although the entire execution is generally wild, certain examples show wild function execution WF1 and WF2 occurring at different portions of time. For example, wild function execution WF1 swings up and down in percentage of execution between approximately 700 ms and 1150 ms with large spikes occurring between approximately 717 ms and 867 ms, and 1000 ms and 1150 ms, respectively. Likewise, wild function execution WF2 swings up and down in percentage of execution between approximately 1430 ms to 1925 ms with large spikes occurring between approximately 1430 ms and 1700 ms, and 1722 ms and 1900 ms, respectively. Though these are just a few examples as the overall execution shown in FIG. 16 is generally wild. Although many aspects of function execution could exhibit wild traits, in video game processing, such execution is sometimes exhibited during mathematical processing operations, such as matrix multiplication and/or calling a square root function.

Figure 17:
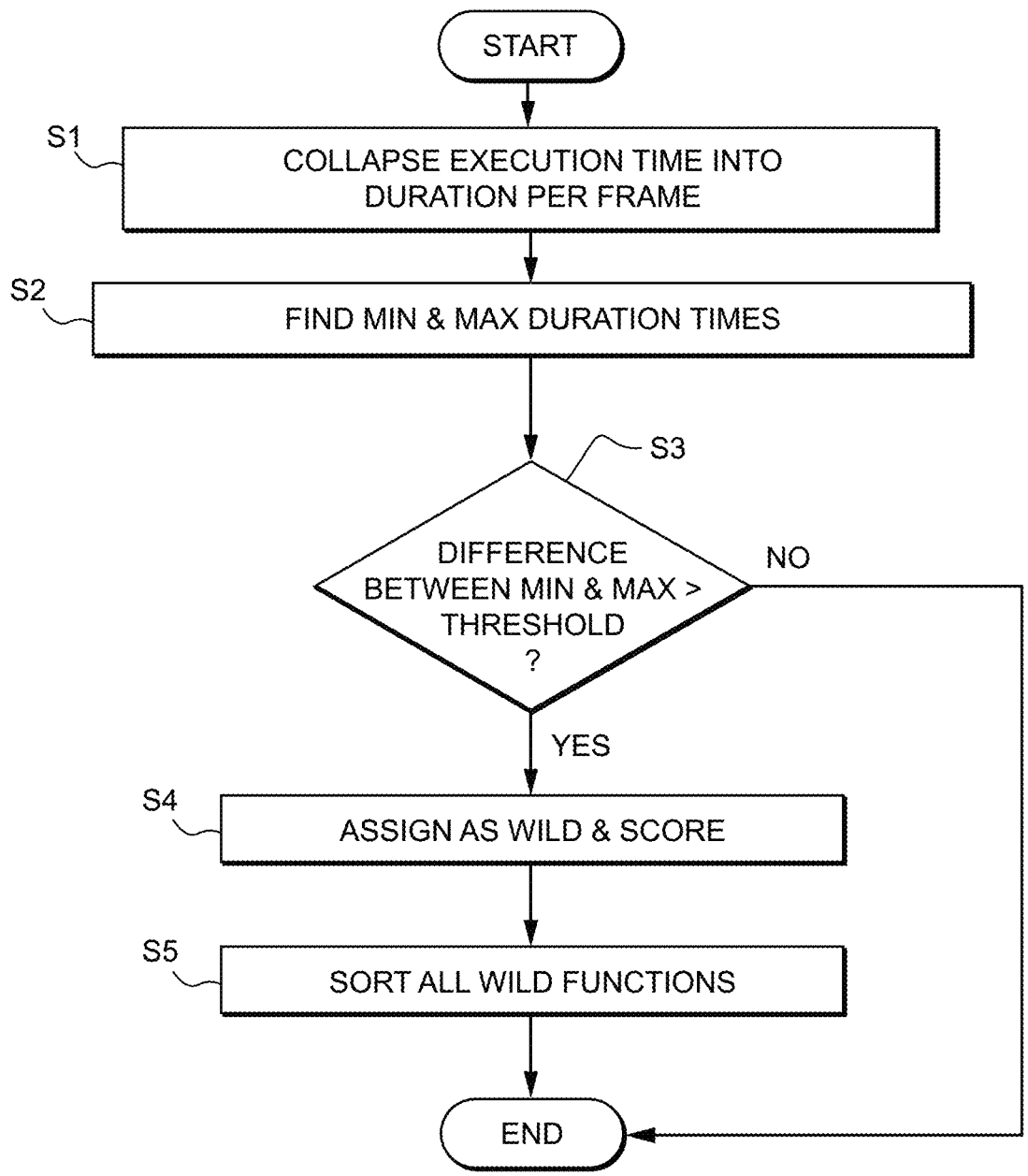
FIG. 17 shows a non-limiting example process for detecting types of behavior in executing functions.

FIG. 17 depicts an example process for detecting wild function execution. The process can be iterated over all functions and begins by, for a given frame rate, collapsing all execution times into duration per frame (S1). The process then finds the minimum and maximum duration times over all duration per frame times (S2). If the difference between the minimum and maximum is greater than a threshold (e.g., "20%" as defined by a user) (S3), then the process considers the function as a wild function and proceeds to score the function (S4). In scoring the function, the process finds the largest difference between consecutive pairs of duration per frame times between all pairs of consecutive duration per frame times. The function's wild score is the difference between the maximum and minimum duration per frame times. Upon scoring the functions, the process sorts all wild functions from highest scoring to lowest scoring and can display the same to a user (S5).

Figure 18:
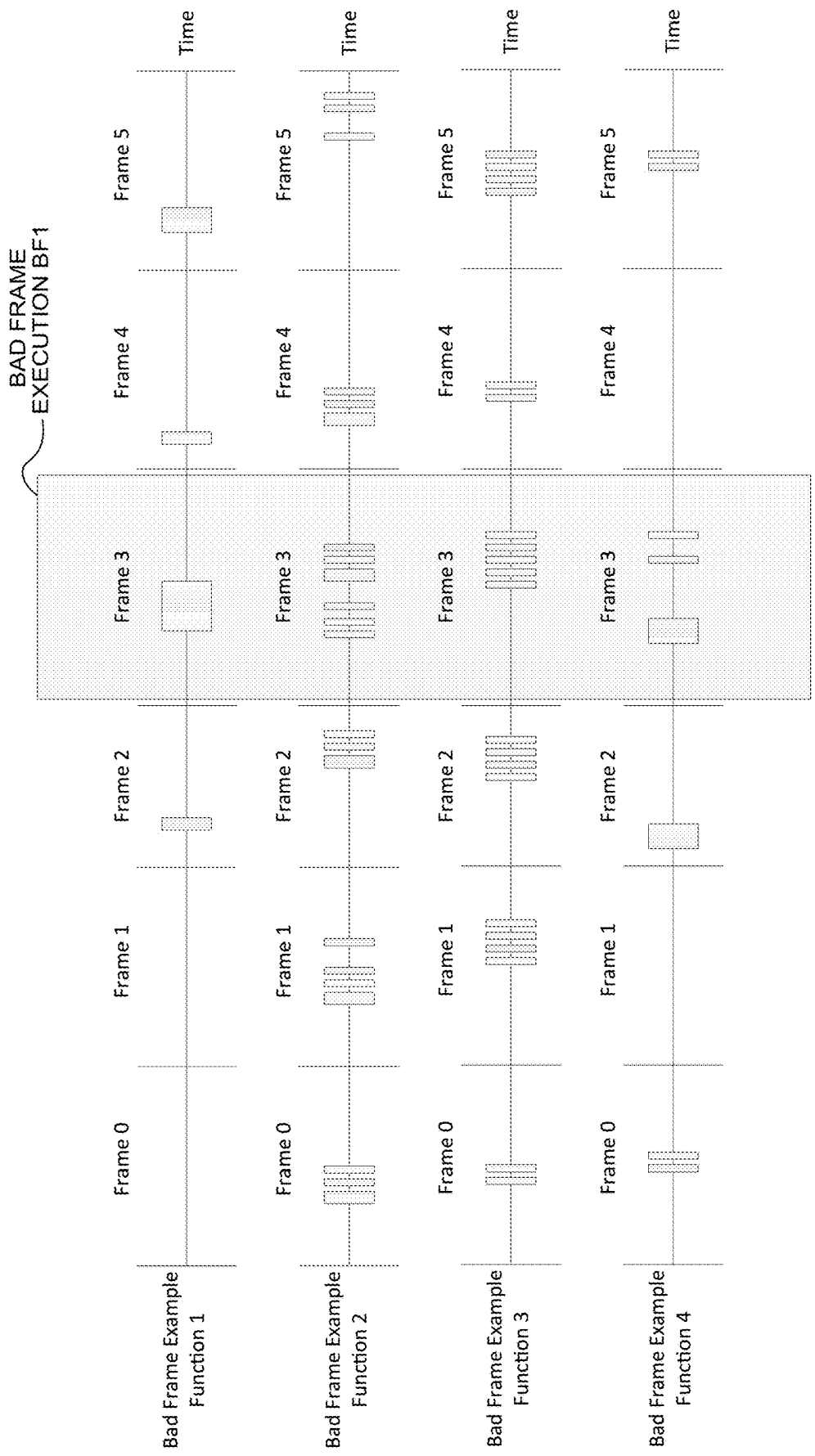
FIG. 18 shows a non-limiting example for identifying behavior during one or more frames of program execution.

FIG. 18 shows a non-limiting example of identifying one or more "bad frames" of function execution. Bad frames can be generally indicative of one or more functions executing longer than normal during one frame when compared to its average execution on other frames. An example of a bad frame of function execution BF1 is shown in FIG. 18 over frame 3 for functions 1-4. As can be seen in FIG. 18, functions 1-4 have generally consistent function execution percentages during frames 0-2, 4, and 5. But, frame 3 tends to show execution occurring for larger amounts when compared to the other portions. For example, function 1 runs for little to no time during frames 0-2, 4, and 5, but runs for a relatively larger percentage of time during frame 3. The same occurs for functions 2-4. It should be appreciated that, unlike the analysis described for the other five types of anomalies, "bad frame" execution looks to the processing time of a particular frame with respect to one or more other frames during a specified window of time. The behavior of a "bad frame" can tend to show the same symptoms across all functions executing during the "bad frame." A user could theoretically identify common functions executing during each "bad frame" to narrow down, or specifically identify execution in a specific function causing the frame to be identified as a "bad frame."

Figure 19:
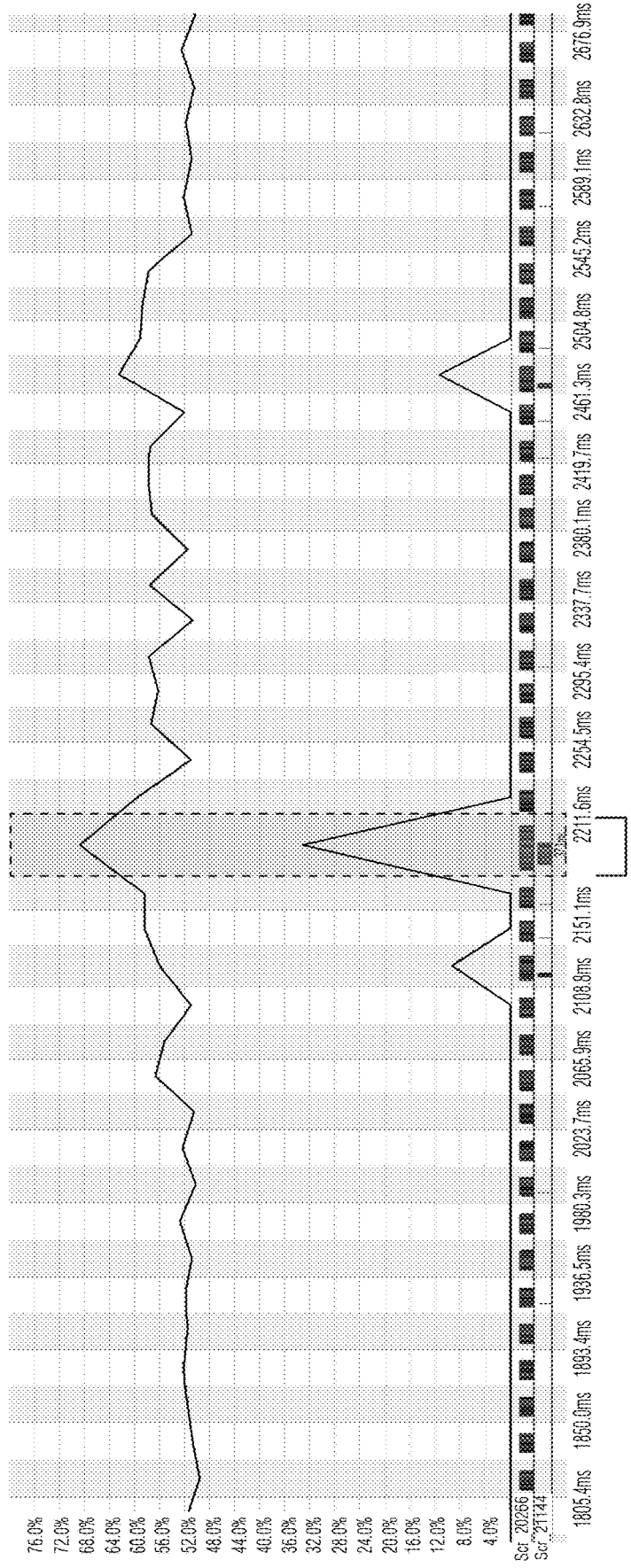
FIG. 19 depicts a non-limiting example graphical representing for identifying behavior during one or more frames of program execution.

FIG. 19 shows an example of a bad frame of execution that occurs during a larger time frame of execution spanning approximately 800 ms. As can be seen in FIG. 19, execution occurs for each frame relatively consistently between frames except for bad frame execution BF1 occurring between approximately 2175 ms and 2211 ms. In this example, each frame executes at approximately 20 ms intervals. But, bad frame execution BF1 spans 37.1 ms which is almost double the amount of time compared to other frames. The pattern of behavior for a bad frame is similar to rare function execution except that an individual frame is identified as being problematic in this example. Furthermore, bad frame detection does not look to any particular periodic behavior in its analysis.

Figure 20:
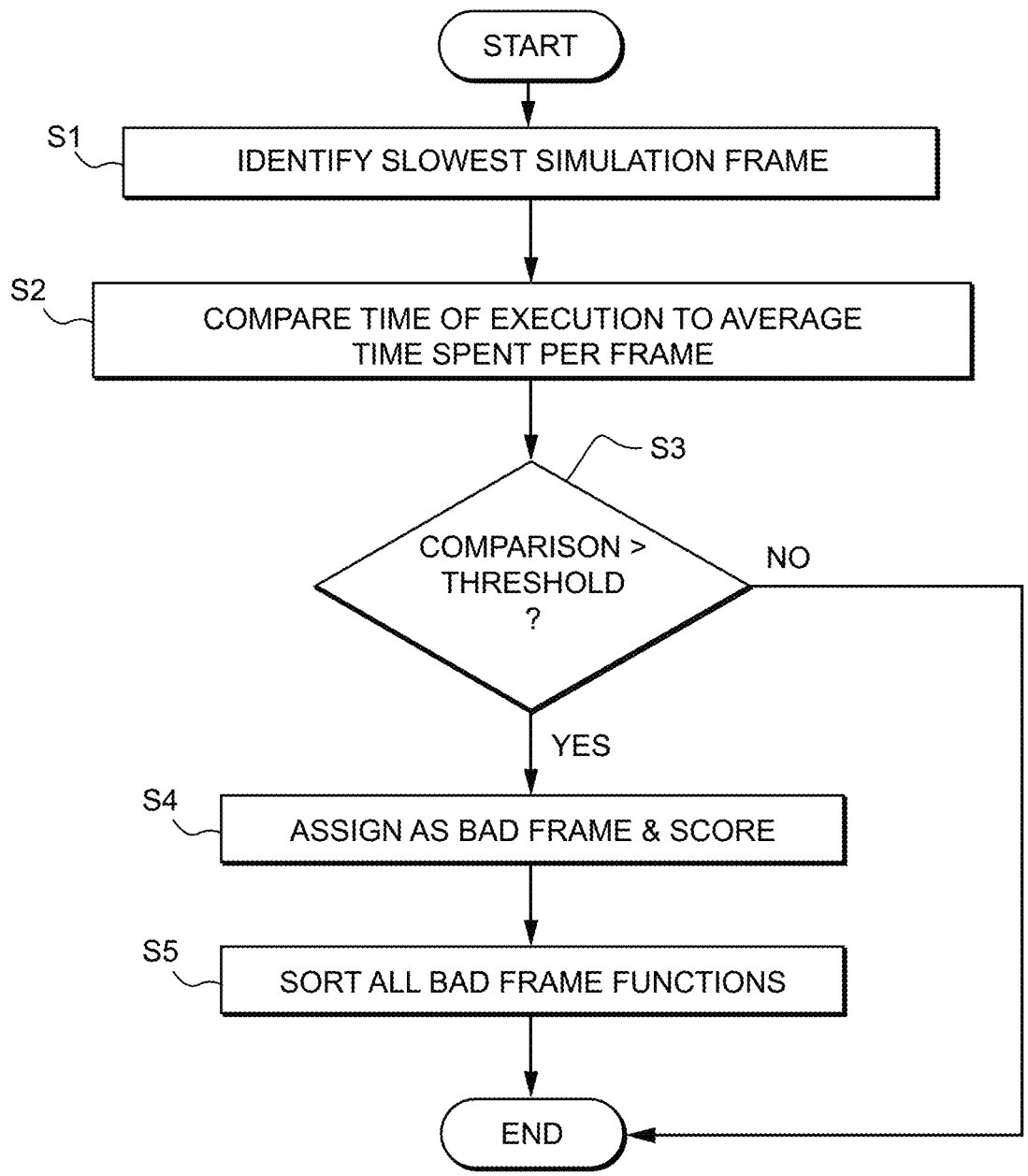
FIG. 20 is a non-limiting example process for identifying behavior during one or more frames of program execution.

FIG. 20 depicts an example process for detecting a bad frame of function execution. The process begins by identifying the slowest simulation frame (e.g., the frame that took the longest amount of time to process) (S1). The process then proceeds by, for all functions that executed during this slow frame, compares the time the function executed during this frame to the average time spent per frame on all other frames (e.g., compares the average execution time to all other frames) (S2). If the function spent more time during the slow frame than the average frame time on all other frames (S3), then the process considers this a bad frame function and continues to score the function (S4). In scoring the function, the process can assign the bad frame score as being equal to the execution time spent on the slow frame. Alternatively, instead of scoring based on the execution time during the frame, the process can determine the average time on other frames and score based on a difference between the execution time during the bad frame and the average time of all other frames. Upon scoring, the process proceeds to sort all bad frame functions from highest scoring to lowest scoring and can display to the same to a user (S5). For example, the display could show a line graph where each function is sorted and the one or more "bad frames" of execution are labeled in the display. It should also be appreciated that the processes described in FIG. 20 can be iterated over all execution functions.

It should be appreciated that the system can employ any one, or all of these methods, in various combinations, in finding certain anomalies in functions execution. Furthermore, the system is not limited only to the methods described in this specification, and envisions identifying a plurality of different types of anomalies occurring during program execution.

While the technology has been described in connection with what is presently considered to be the most practical and preferred embodiment, it is to be understood that the technology is not to be limited to the disclosed embodiment, but on the contrary, is intended to cover various modifications and equivalent arrangements.

At least the following is claimed:

1. A system for detecting anomalous execution in a program, comprising:
   a processing system having at least one processor and at least one memory, the processing system configured to:
   obtain program execution data of a running program, running on an information processing device operatively coupled to the system, to identify aspects of function execution, the program execution data stored in a memory of the information processing device;
   identify one or more patterns of execution for one or more functions executing in the running program;
   generate a score associated with the one or more patterns of execution for the one or more functions;
   identify a type of anomaly, from one or more anomaly classifications stored in the memory of the processing system, based on, at least in part, the score associated with the one or more patterns of execution for the one or more functions; and
   generate a display showing function execution over time including a graphical display of at least the identified type of anomaly.

2. The system of claim 1, wherein the processing system is further configured to identify the type of anomaly based on a degree of periodicity of the one or more executing functions.

3. The system of claim 1, wherein the processing system is further configured to identify the type of anomaly based on a degree of non-periodicity of the one or more executing functions.

4. The system of claim 1, wherein the processing system is further configured to identify the type of anomaly based on behavior exhibited during one or more frames of function execution.

5. The system of claim 1, wherein the program execution data includes, at least, address data indicating where in the memory program instructions are stored.

6. The system of claim 1, wherein the program execution data includes, at least, count of times one or more functions are called in the running program.

7. A system for detecting anomalous execution in a program, comprising:
   a processing system having at least one processor and at least one memory, the processing system configured to:
   obtain program execution data of a running program to identify one or more patterns of function execution;
   identify a type of anomaly, from one or more types of anomaly classifications stored in the memory of the processing system, based on, at least in part, a score associated with the one or more patterns of function execution; and
   generate a display showing function execution including at least the identified type of anomaly.

8. The system of claim 7, wherein the processing system is further configured to assign one or more classifications to the identified anomalies.

9. The system of claim 8, wherein the one or more classifications are assigned to the identified anomalies based on a periodicity of function execution exhibited by the anomalies.

10. The system of claim 8, wherein the one or more classifications are assigned to the identified anomalies based on a non-periodicity of function execution exhibited by the anomalies.

11. The system of claim 8, wherein the one or more classifications are assigned to the identified anomalies based on aspects related to execution behavior occurring during one or more frames of execution.

12. The system of claim 7, wherein the generated display comprising a graph showing a percentage of execution along a first axis and function execution over time along a second axis.

13. The system of claim 7, wherein the identified type of anomaly is selected from a group comprising at least one of rare function execution, flutter function execution, swell function execution, and/or wild function execution.

14. The system of claim 7, wherein the program execution data includes, at least, address data indicating where in the memory program instructions are stored.

15. A method implemented using an information processing system having at least one processor and at least one memory, the method comprising:
   obtaining program execution data of a running program to identify one or more patterns of function execution;
   identifying a type of anomaly, from one or more types of anomaly classifications stored in the memory of the information processing system, based on, at least in part, a score associated with the one or more patterns of function execution; and
   generating a display showing function execution including at least the identified type of anomaly from the one or more types of anomalies.

16. The method of claim 15, wherein the one or more types of anomalies are assigned a classification based on a periodicity of function execution exhibited by the anomalies.

17. The method of claim 15, wherein the one or more types of anomalies are assigned a classification based on a non-periodicity of function execution exhibited by the anomalies.

18. The method of claim 15, wherein the one or more types of anomalies are assigned a classification based on aspects related to execution behavior occurring during one or more frames of execution.

19. A non-transitory computer readable storage medium comprising a computer program having code executable by an information processing apparatus, the computer program, when executed, causing the information processing apparatus to:
   obtain program execution data of a running program to identify one or more patterns of function execution;
   identify a type of anomaly, from one or more types of anomaly classifications stored in a memory of the information processing apparatus, based on, at least in part, a score associated with the one or more patterns of function execution; and generate a display showing function execution including at least the identified type of anomaly from the one or more types of anomalies.

20. The non-transitory computer readable storage medium of claim 19, wherein the one or more types of anomalies are assigned a classification based on a periodicity of function execution exhibited by the anomalies.

21. The non-transitory computer readable storage medium of claim 19, wherein the one or more types of anomalies are assigned a classification based on a non-periodicity of function execution exhibited by the anomalies.

22. The non-transitory computer readable storage medium of claim 19, wherein the one or more types of anomalies are assigned a classification based on aspects related to execution behavior occurring during one or more frames of execution.

\* \* \* \* \*